US007126472B2

(12) United States Patent
Kraus et al.

(10) Patent No.: US 7,126,472 B2
(45) Date of Patent: Oct. 24, 2006

(54) SYSTEM AND METHOD OF PROVIDING EMERGENCY RESPONSE TO A USER CARRYING A USER DEVICE

(76) Inventors: Mark W Kraus, 345 Woodedge Dr., Bloomfield Hills, MI (US) 48304; Paul G Toenjes, 1510 Oxford, Grosse Pointe Woods, MI (US) 48236

( * ) Notice: Subject to any disclaimer, the term of this patent is extended or adjusted under 35 U.S.C. 154(b) by 107 days.

(21) Appl. No.: 10/896,289

(22) Filed: Jul. 21, 2004

(65) Prior Publication Data

US 2005/0031102 A1    Feb. 10, 2005

Related U.S. Application Data

(60) Provisional application No. 60/489,022, filed on Jul. 22, 2003.

(51) Int. Cl.
*G08B 1/08*       (2006.01)
(52) U.S. Cl. .......................... 340/539.18; 340/286.02; 340/539.11; 340/502
(58) Field of Classification Search ............ 349/539.1, 349/539.11, 539.12, 539.13, 539.14, 539.16, 349/539.22, 286.02, 286.06, 286.07; 709/206; 705/9; 455/90.2, 550.1; 340/500, 502, 503, 340/504, 506, 539.18, 539.19
See application file for complete search history.

(56) References Cited

U.S. PATENT DOCUMENTS

| | | | |
|---|---|---|---|
| 5,091,930 A | 2/1992 | Shapiro | |
| 5,333,171 A | 7/1994 | Wang et al. | |
| 5,416,695 A | 5/1995 | Stutman et al. | |
| 5,461,365 A | 10/1995 | Schlager et al. | |
| 5,554,993 A | 9/1996 | Brickell | |
| 5,629,678 A | 5/1997 | Gargano et al. | |
| 5,808,564 A | 9/1998 | Simms et al. | |
| 5,815,503 A | 9/1998 | Li | |
| 5,838,237 A | 11/1998 | Revell et al. | |
| 5,852,468 A | 12/1998 | Okada | |
| 6,014,080 A | 1/2000 | Layson, Jr. | |

(Continued)

FOREIGN PATENT DOCUMENTS

KR    2002029996 A    4/2002

(Continued)

OTHER PUBLICATIONS

Book excerpt entitled "Internet Protocols," Internetworking Technology Overview, pp. 30/1-30/16, Jun. 1999.

(Continued)

*Primary Examiner*—Van T. Trieu
(74) *Attorney, Agent, or Firm*—Howard & Howard

(57) ABSTRACT

The subject invention provides a method of providing emergency response to a user carrying a user device (32). The method establishes a monitoring database (34) including identifications for a plurality of user devices (32) and user information associated with each of the user devices (32). The monitoring database (34) includes a list of contacts to be contacted in an emergency for each user of each user device (32). An internet protocol (IP) address is established for the monitoring database (34) and for each user device (32). One of the user devices (32) is selected in the database and at least one of the selected user device (32) or at least one contact from the list of contacts associated with the selected user device (32) is notified of the emergency. The communication between the monitoring database (34) and the selected user device (32) is established over the Internet (36) using internet protocols to notify the selected user device (32) and/or the contact.

25 Claims, 21 Drawing Sheets

U.S. PATENT DOCUMENTS

| | | |
|---|---|---|
| 6,100,806 A | 8/2000 | Gaukel |
| 6,201,856 B1 | 3/2001 | Orwick et al. |
| 6,259,399 B1 | 7/2001 | Krasner |
| 6,259,695 B1 | 7/2001 | Ofek |
| 6,262,666 B1 | 7/2001 | Lodichand |
| 6,263,280 B1 | 7/2001 | Stingone, Jr. |
| 6,362,778 B1 | 3/2002 | Neher |
| 6,363,247 B1 | 3/2002 | Gum |
| 6,388,612 B1 | 5/2002 | Neher |
| 6,405,049 B1 | 6/2002 | Herrod et al. |
| 6,512,456 B1 | 1/2003 | Taylor, Jr. |
| 6,515,985 B1 | 2/2003 | Shmulevich et al. |
| 6,519,466 B1 | 2/2003 | Pande et al. |
| 6,529,500 B1 | 3/2003 | Pandharipande ............ 370/352 |
| 6,559,620 B1 | 5/2003 | Zhou et al. |
| 6,504,908 B1 | 6/2003 | Bellomo et al. |
| 6,574,480 B1 | 6/2003 | Foladare et al. |
| 6,611,516 B1 | 8/2003 | Pirkola et al. |
| 6,678,357 B1 | 1/2004 | Stumer et al. |
| 6,763,226 B1 * | 7/2004 | McZeal, Jr. ................ 455/90.2 |
| 6,807,564 B1 * | 10/2004 | Zellner et al. .............. 709/206 |
| 6,965,868 B1 * | 11/2005 | Bednarek ....................... 705/9 |
| 2001/0026223 A1 | 10/2001 | Menard et al. |
| 2002/0085538 A1 | 7/2002 | Leung |
| 2003/0179743 A1 | 9/2003 | Bosik et al. |

FOREIGN PATENT DOCUMENTS

| | | |
|---|---|---|
| WO | WO 01/06744 A1 | 1/2001 |
| WO | WO 01/76276 A2 | 10/2001 |

OTHER PUBLICATIONS

Publication entitled "Network and Acoustic Echo Issues in Voice-Over-Packet Telephony Systems," by Patrik Sorqvist and Lester Ngia of Global IP Sound, Inc., pp. 1-22, (2002).

Publication entitled "Defining The Space: VoIP, IP Telephony and Convergence," by Avaya, Inc., Oct. 2003.

Web Site www.digitalangel.net, by Digital Angel Corporation, 12 Pages, (2003).

Document entitled "The GPS Personal Locator Watch Is Not Just For Children!" author unknown, 6 Pages.

International Search Report of PCT Appln PCT/US04/23493 dated Dec. 15, 2004.

* cited by examiner

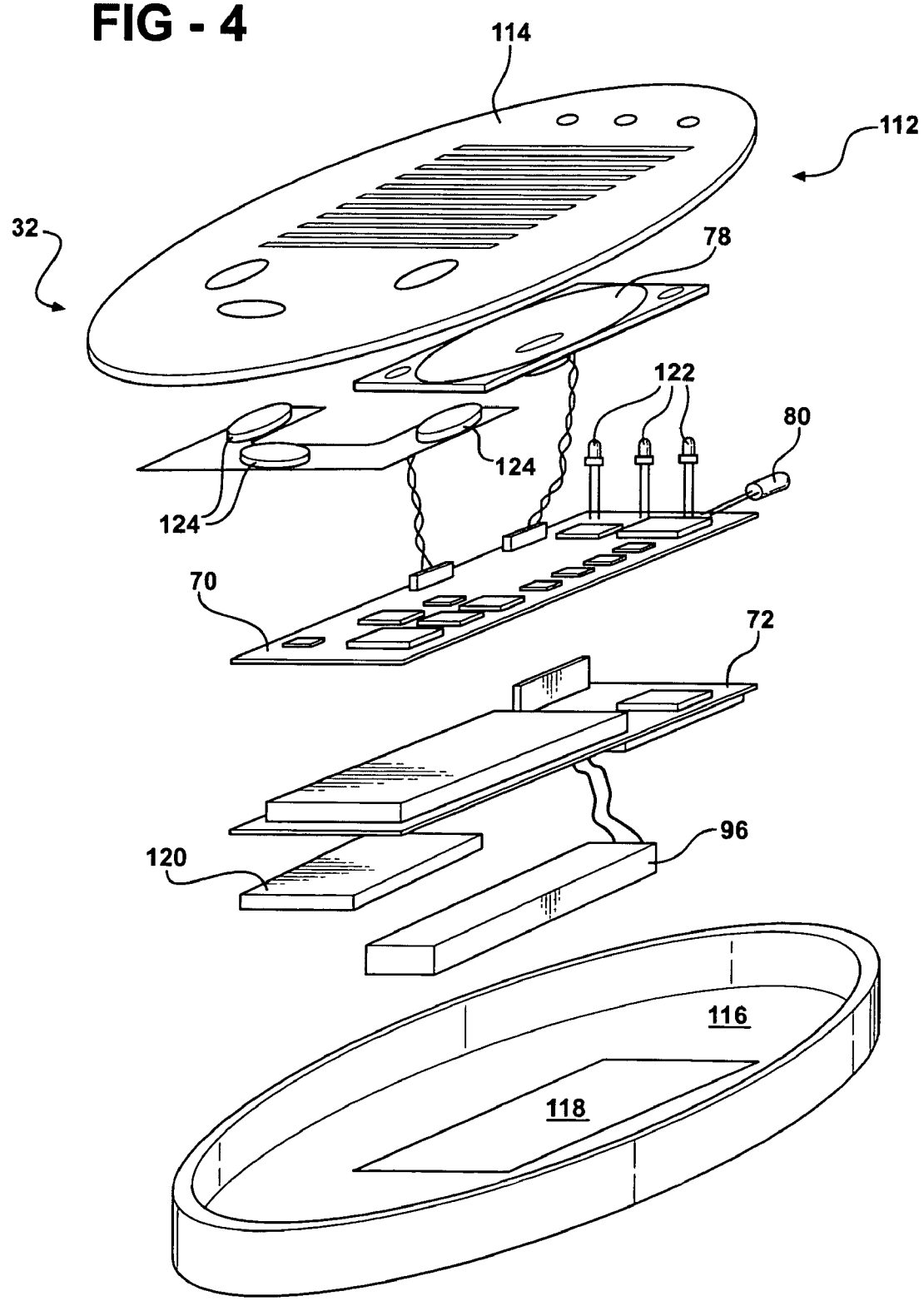

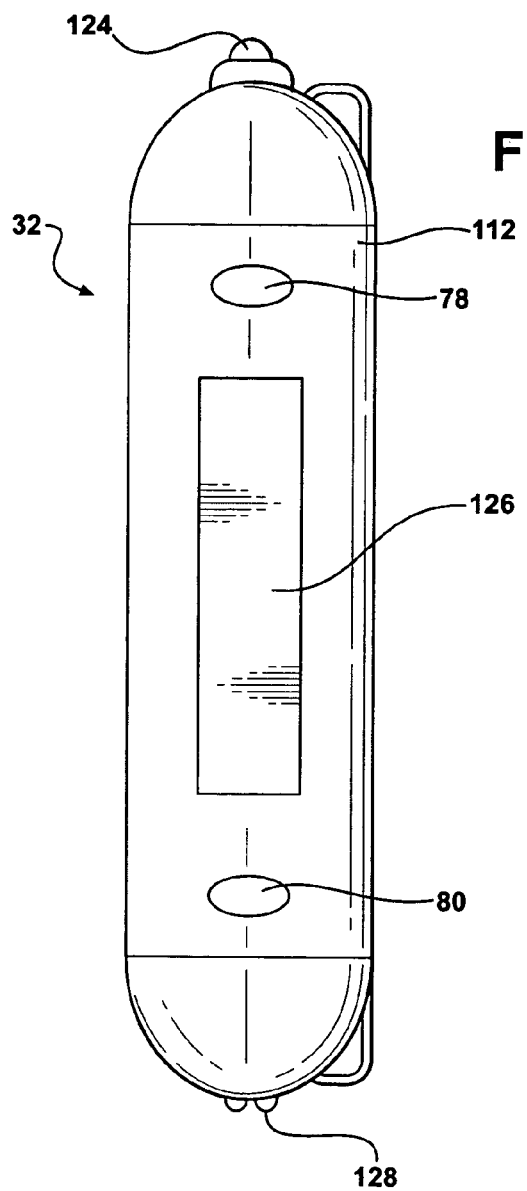
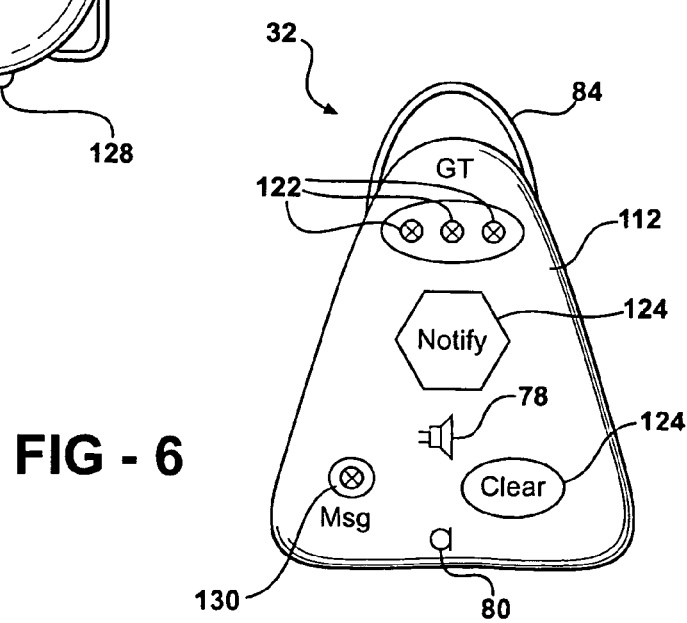
FIG - 5
FIG - 6

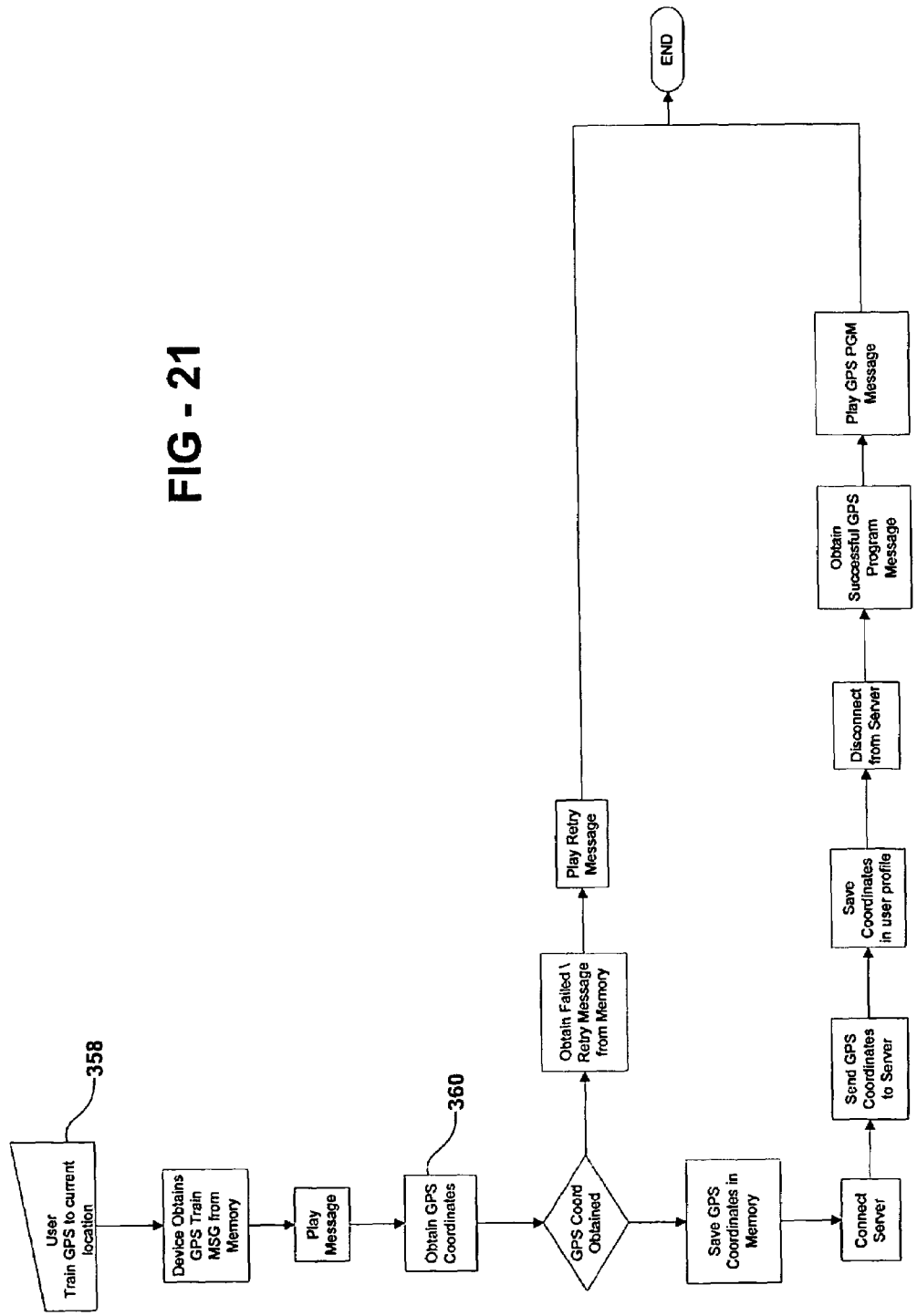

SYSTEM AND METHOD OF PROVIDING EMERGENCY RESPONSE TO A USER CARRYING A USER DEVICE

CROSS-REFERENCES TO RELATED APPLICATIONS

This application claims priority to U.S. Provisional Patent Application No. 60/489,022 filed Jul. 22, 2003.

BACKGROUND OF THE INVENTION

1. Field of the Invention

The subject invention relates to a method of providing emergency response to a user carrying a user device and more specifically to establishing communication between the user device and a monitoring database over the Internet to provide such responses.

2. Description of the Related Art

Various related art methods and devices are known for providing emergency response to a user and for monitoring the user. One such method connects a device to the public switched telephone network (PSTN) and the device acts as a speakerphone. If the user encounters an emergency or incident at a distance far from the speakerphone, the user is not able to communicate the nature of the emergency to a human advisor. When the emergency is unknown, emergency personnel, such as police officers, may be called to respond, when such a response is not required. Therefore, the user will not activate their system for fear of being unable to communicate the nature of the emergency effectively and being embarrassed when emergency personnel arrive. Another limitation of the related art device is that the user cannot receive assistance if the user is not inside the home or is too far away to activate the device.

Another related art monitoring system is disclosed in U.S. Pat. No. 6,512,456. The '456 patent discloses a mobile monitoring system that includes an oversight authority and a user device to monitor bodily function information for the user. The information is transmitted from the user device to the oversight authority. The oversight authority may then notify friends and family as necessary depending upon the information obtained from the user. The information may also include the position of the user based upon global positioning coordinates. The user device communicates the information to a receiving tower that is coupled to the oversight authority. However, the '456 patent does not establish communication between the oversight authority and the user device using the Internet and does not utilize voice-over internet protocols to transmit the information or establish communication.

Other related art systems track users using global positioning systems (GPS) and monitor the user's location. These systems transmit the information to various contacts so that the contacts are able to track the user. Additionally, voice-over internet protocol (VoIP) is increasingly being used for communication over the Internet instead of using the PSTN. However, no related art systems combine monitoring and tracking of the user with the user being able to notify contacts of emergency or incidents by establishing communication over the Internet.

Accordingly, the related art methods are characterized by one or more inadequacies. It would be advantageous to provide a system and user device that overcomes the inadequacies described above.

BRIEF SUMMARY OF THE INVENTION AND ADVANTAGES

The subject invention provides a method of providing emergency response to a user carrying a user device. The method establishes a monitoring database including identifications for a plurality of user devices and user information associated with each of the user devices. The monitoring database includes a list of contacts to be contacted in an emergency for each user of each user device. An internet protocol (IP) address is established for the monitoring database and for each user device. One of the user devices is selected in the database and at least one of the selected user device and/or at least one contact from the list of contacts associated with the selected user device is notified of the emergency. The communication between the monitoring database and the selected user device to notify the selected user device and/or the contact is established over the Internet using internet protocols.

The subject invention overcomes the inadequacies that characterize the related art systems. The subject invention allows the user to establish communication using internet protocols directly through the user device with the contact over the Internet. So long as the device is within arms reach, the user requests immediate assistance by notifying the monitoring database and the monitoring database assess the emergency and alert the contacts or emergency personnel.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein:

FIG. 4 is an exploded view of one embodiment of the user device;

FIG. 5 is a side view of another embodiment of the user device;

FIG. 6 is a front view of yet another embodiment of the user device;

FIG. 21 is a flowchart illustrating the use of the user device and the monitoring database to act as a geofence.

DETAILED DESCRIPTION OF THE INVENTION

Figure 1:
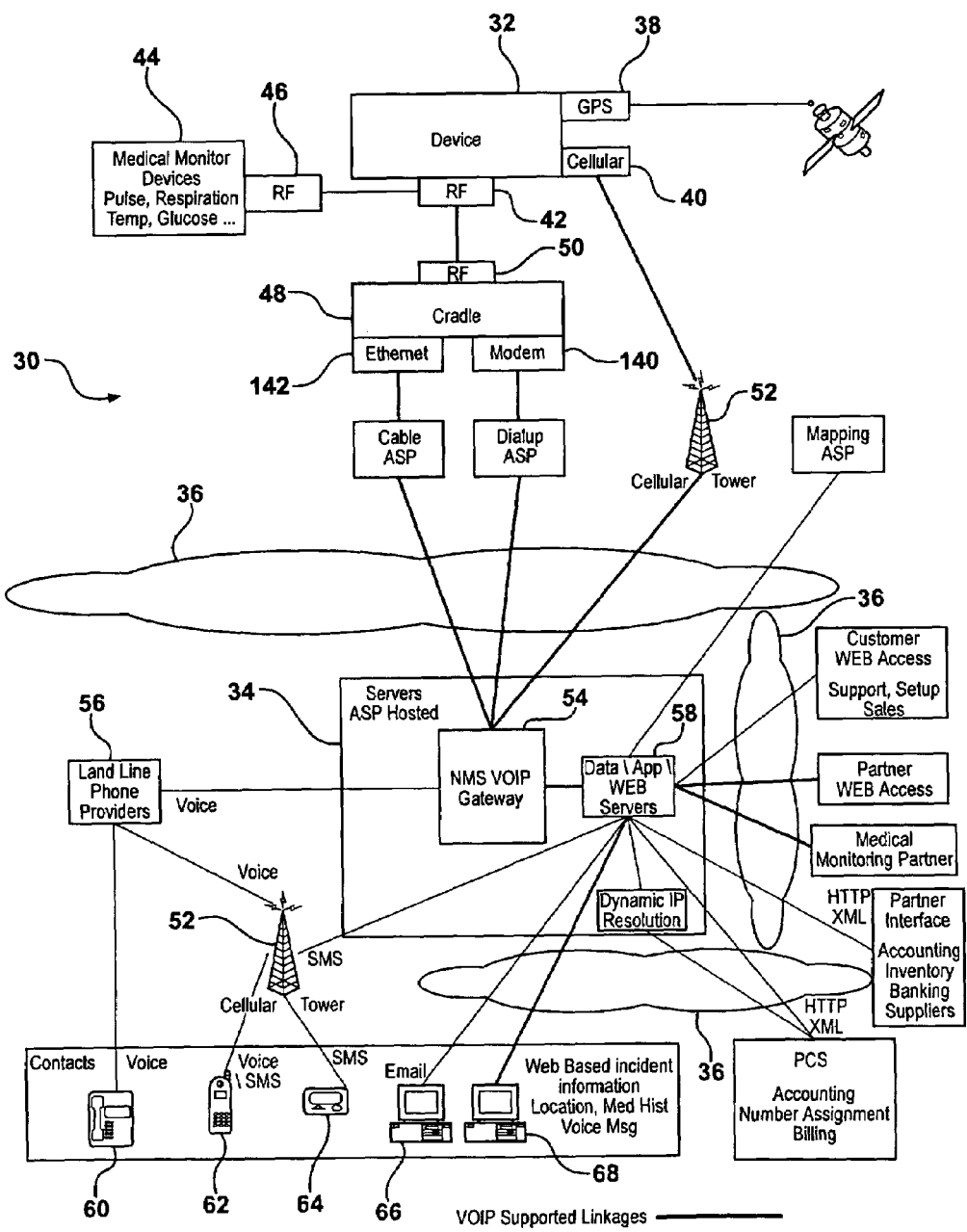
FIG. 1 is a graphical representation of an emergency alert system having a user device and a monitoring database communicating via the Internet.

Referring to the Figures, wherein like numerals indicate like parts throughout the several views, an emergency alert system is disclosed generally at 30 in FIG. 1. The emergency alert system 30 includes a user device 32 carried by a user (not shown) and a monitoring database 34. The user device 32 and the monitoring database 34 communicate via internet protocols (IP) over the Internet 36. The Internet 36 is illustrated in FIG. 1 as generically cloud-shaped and interconnecting various components. It is to be appreciated that IP includes transmission control protocols (TCP) and any other connectionless, packet switching protocol that may be employed to communicate across the Internet 36. The preferred internet protocol is TCP/IP, but the subject invention contemplates use with other internet protocols, such as file transfer protocol (FTP). The Internet 36 refers to a system of interconnected networks that connects computers around the world and that communicate via TCP/IP, as understood by those skilled in the art.

Figure 2:
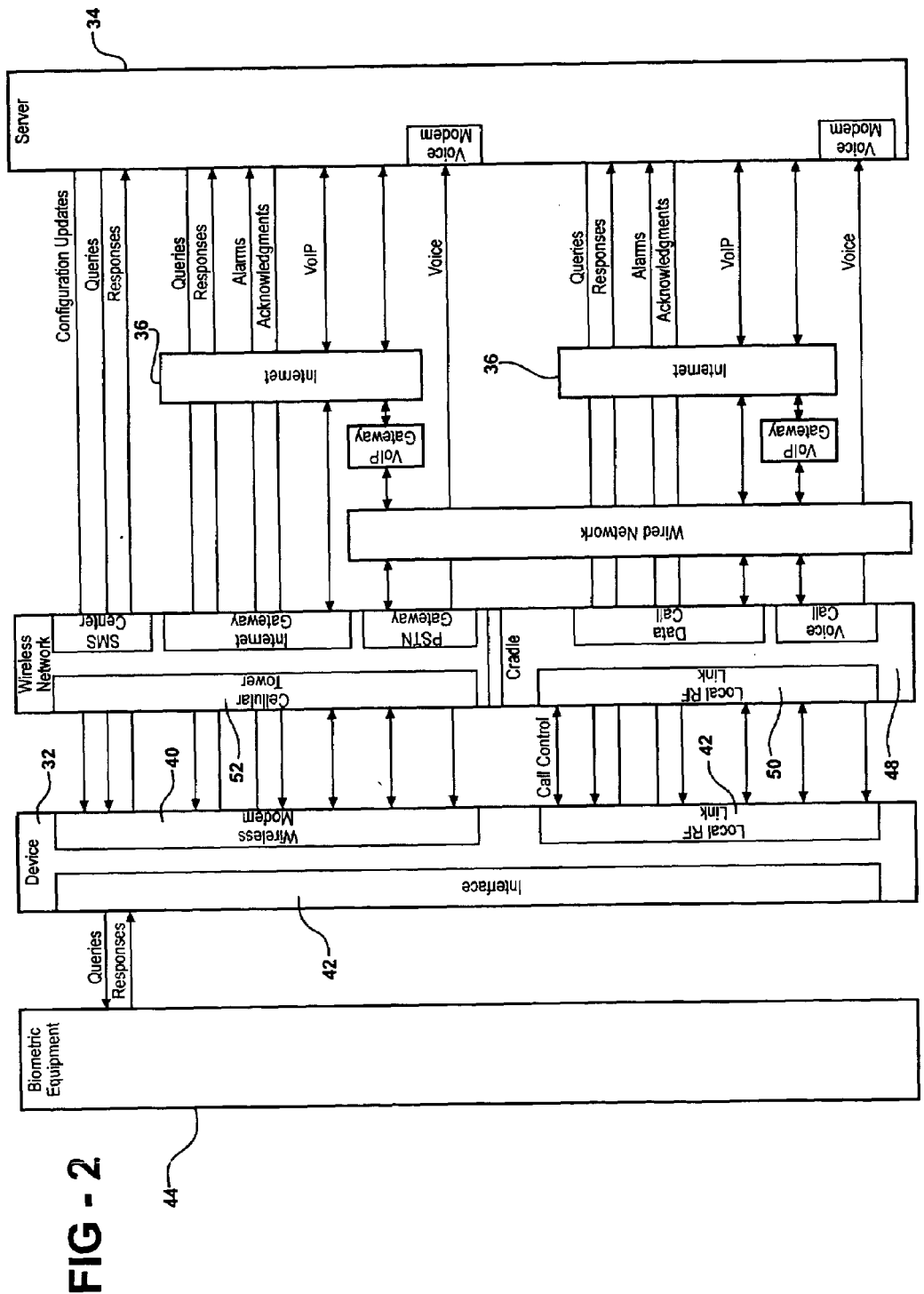
FIG. 2 is another graphical representation of the emergency alert system shown in FIG. 1.

Referring to FIGS. 1 and 2, the system 30 is graphically illustrated connecting the user device 32 and the monitoring database 34 via the Internet 36. The system 30 includes the user device 32 having a global positioning system (GPS) receiver 38 obtaining coordinates of the user device 32, a cellular modem 40, and a radio frequency (RF) module 42. The user device 32 may also communicate with biometric equipment 44. The biometric equipment 44 has an RF module 46 that establishes communication through the RF module 42 of the user device 32 via RF signals. The user device 32 may also communicate with a cradle 48. The cradle 48 has a RF module 50 for communicating via RF signals with the RF module 42 of the user device 32. The user device 32 is also illustrated as communicating with a cellular network via a cellular tower 52. The cellular modem 40 of the user device 32 transmits cellular signals to the cellular tower 52 for accessing the cellular network.

Both the cellular network and the cradle 48 are connected to the Internet 36. Therefore, the user device 32 preferably only communicates with one of the cellular network or the cradle 48 at any given instant. However, there may be times when communicating over both is desirable. Both the cellular modem 40 and the cradle 48 are capable of transmitting signals based on IP and support Voice-over Internet Protocol (VoIP), which will be described in more detail below. The VoIP is shown as thicker linkages in FIG. 1.

The monitoring database 34 has an IP address and is also connected to the Internet 36 to receive and transmit signals from and to the user device 32. The monitoring database 34 is preferably a server as understood by those skilled in the art. The monitoring database 34 includes a gateway 54 that is preferably connected to a public switched telephone network (PSTN) 56 for transmitting voice and voice/data servers 58 for transmitting voice and data over the Internet 36.

The monitoring database 34 includes identifications for a plurality of user devices 32 and user information associated with each of the user devices 32. The user information includes a list of contacts to be contacted in an emergency for each user of each user device 32. The contacts may be defined by the user and the list may be accessible through any web-based application to allow the user to update or modify the list. The term contact is interchangeable with the term angel as used in the Figures. Selected contacts may have administrator level access to update and modify the list on behalf of the user, especially when the user is elderly. The list of contacts includes a preferred method of contacting each of the contacts and each contact may have multiple methods of being contacted in successive order. For example, the monitoring database 34 may attempt to notify the contact at a home telephone number, then a work telephone number, then a cellular telephone number, then a pager, and then by email. Additionally, each contact may have specified times that each number is the preferred contact and it may also depend upon the scenario or emergency.

After a predetermined number of attempts to one contact, the monitoring database 34 may then proceed to the next contact and attempt to notify them of the incident or emergency. One advantage of the subject invention is that the monitoring database 34 may notify the contact using either the PSTN 56 or the Internet 36 through the servers 58 using VoIP, short message service (SMS), and the like, for those supported devices, such as the home telephone number, pager, email, etc. In FIG. 1, the monitoring database 34 is illustrated communicating to the PSTN 56 for transmitting to a landline telephone 60 and to the cellular network to reach a mobile phone 62 or pager 64. The monitoring database 34 also communicates through the servers 58 for transmitting emails 66 and web based information 68 to the contact. The monitoring database 34 may receive user information and allow user access via the Internet 36, as well as, partner information, cellular provider information, doctor information, financial institution information, and the like.

The monitoring database 34 may also store user information about the user. The user information may include a home address for the user, telephone, e-mail, user allergies, medical history information, medical treatment information, medical prescription information, and geofence information. Geofence information may include the longitudinal and latitudinal coordinates that the user must remain within. The monitoring database 34 may also store user device 32 information such as, but not limited to, serial number, purchase date, activation date, sales contact, partner information, warranty information, battery life, and/or error reports generated about the user device 32.

Referring to FIG. 2, a flowchart illustrates the communication between the biometric equipment 44 and the user device 32 via RF signals. The user device 32 communicates between the cellular network and the cradle 48 via the cellular modem 40 or the RF modules 42, 50. The cellular modem 40 may communicate via SMS centers, an internet gateway 54 through the Internet 36, or a PSTN gateway 54 through the Internet 36 to reach the monitoring database 34.

The cradle 48 communicates with the monitoring database 34 via wired networks through to the Internet 36.

The subject invention may further include the RF module 42 of the user device 32 communicating with biometric equipment 44 attached to the user. The biometric equipment 44 has the RF module 46 communicating via radio frequency signals with the RF module 42 of the user device 32. In the preferred embodiment, the RF module 42 of the user device 32 and the biometric equipment 44 communicate using Bluetooth® protocols. It is most preferred that all RF communications use Bluetooth® protocols. Those skilled in the art of radio frequency transmission recognize that Bluetooth® is a standard for transmitting radio frequency signals using frequency hopping spread spectrum such that wires are not necessary. However, the subject invention may be used with any RF signals. The biometric data about the user is transmitted via the RF signals from the biometric equipment 44 to the user device 32. The biometric data may then be transmitted to the monitoring database 34 and stored for compiling medical reports about the user. If the user encounters the incident or emergency, a complete medical history is available for review and the most recent medical condition of the user can be accessed immediately.

Figure 3A:
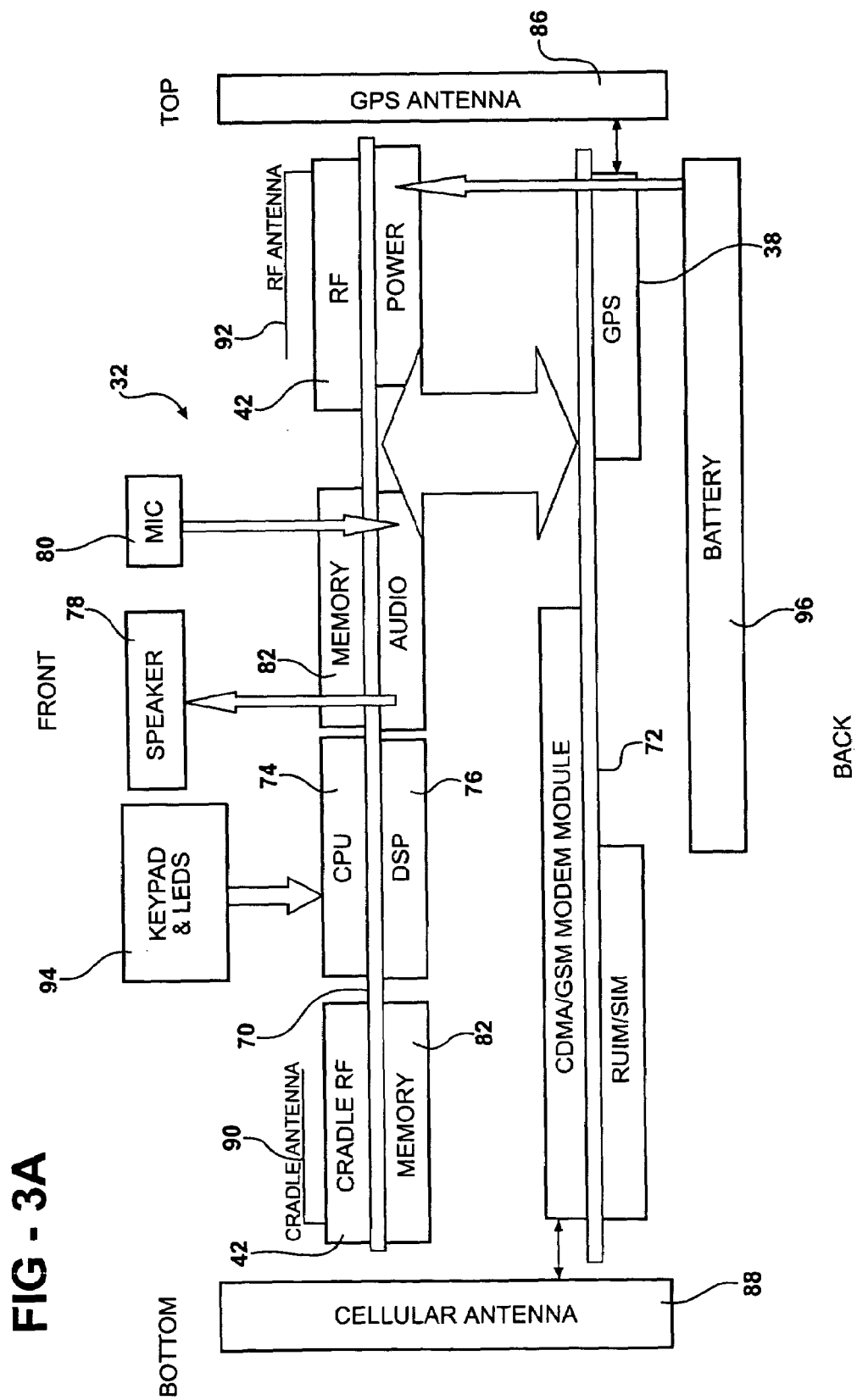
FIG. 3A is a schematic view of the user device.
Figure 3B:
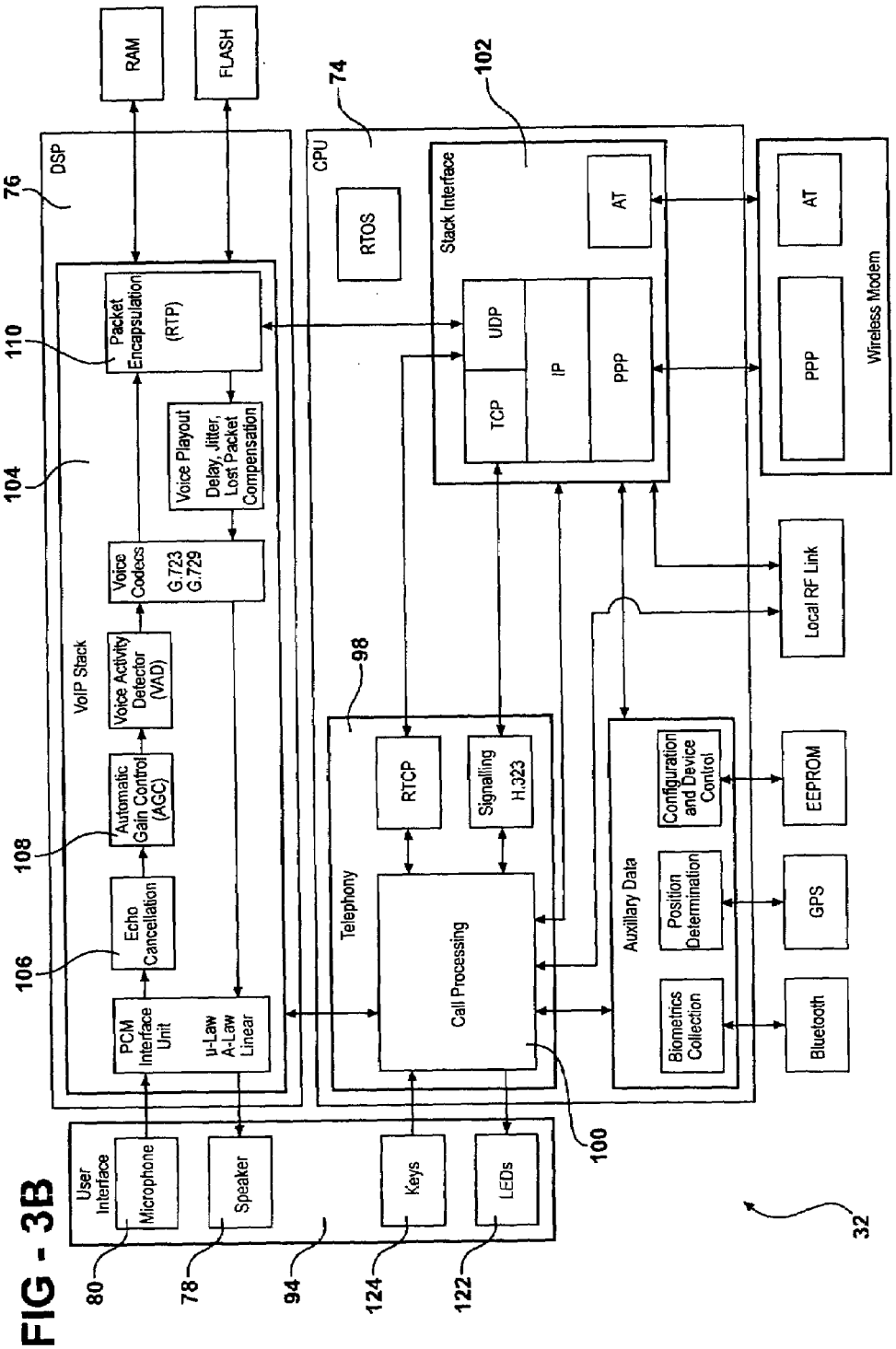
FIG. 3B is another schematic view of the user device.

The user device 32 is schematically illustrated in FIGS. 3A and 3B. FIG. 3A illustrates a partial exploded schematic view of the user device 32 and FIG. 3B is a top down schematic view. In a preferred embodiment, the user device 32 has two printed circuit boards carrying and connecting the components, a main board 70 and a secondary board 72. The main board 70 includes a processor 74 communicating via internet protocols (IP), such as a central processing unit (CPU) having various processing capabilities and a digital signal processor (DSP) 76. The DSP 76 may be used to generate the digital signals transmitted from the user device 32. The main board 70 may also include the RF module 42 for communicating with the cradle 48 or the biometric equipment 44. The user device 32 may include a single RF module or multiple RF modules as is necessary. A speaker 78 and a microphone 80 may also be connected to the main board 70.

A memory source 82 stores an IP address for the user device 32 and an IP address for the monitoring database 34. The memory source 82 may include read-only memory (ROM), electrically erasable programmable ROM (EEPROM), random access memory (RAM), flash, or any other type of memory capable of storing information. Those skilled in the art recognize that the IP addresses are assigned in blocks to service providers. The block of IP addresses are then divided again and assigned by the service providers to their customers. The customers may purchase blocks of IP addresses to assign to their customers, etc. Therefore, the memory source 82 stores the IP addresses that are assigned for both the user device 32 and the monitoring database 34.

The secondary board 72 may include the GPS receiver 38 and the cellular modem 40. The user device 32 may also include at least one antenna 84 for transmitting and receiving signals from the user device 32 from either the main board 70 or the secondary board 72. The antenna 84 is in communication with at least one of the GPS receiver 38, the RF module 42, and the cellular modem 40. In FIG. 3A, the subject invention is illustrated as having a plurality of antennas: a GPS antenna 86, a cellular antenna 88, and two RF antennas 90, 92. The GPS receiver 38 is in communication with the processor 74 and retrieves global positioning coordinates from various satellites to determine the longitudinal and latitudinal coordinates of the user device 32 as understood by those skilled in the art. The global positioning coordinates may then be stored in the memory source 82 or transmitted to the monitoring database 34.

The RF module 42 communicates with the processor 74 for transmitting and receiving RF signals between equipment as will be described more below. The cellular modem 40 is in communication with the processor 74 for establishing the cellular connection to transmit signals over the cellular connection. The speaker 78 and the microphone 80 play and transmit sounds or audio communications through and over the user device 32.

The user device 32 may further include a user input 94 for activating the user device 32. Preferably, the user input 94 is at least one push button 124, or keypad, on a face of the device and may include multiple push buttons 124. There may be one push button 124 to activate the device and another push button 124 to cancel the activation of the device. Alternatively, the same push button 124 may be used to activate and de-activate the user device 32.

A power supply 96 provides power to the user device 32 to power each of the components as necessary. For example, the power supply 96 may provide power to the processor 74 and the memory source 82 and the other components may draw power from the processor 74. Alternatively, each of the components may connect with the power supply 96.

Referring to FIG. 3B, the CPU is illustrated in more detail. The CPU includes a telephony interface 98 having code for completing various call processing 100. The preferred standard for call processing 100 is H.323, but other standards may be used with the subject invention. The call processing 100 may be connected to the user input 94 for activating the device and initiating calls. The CPU also has a stack interface 102 that includes protocols for communicating with the cellular network and for generating the digital signals in internet protocols, such as user datagram protocol (UDP), point-to-point protocol (PPP), TCP, and IP. Auxiliary data is also processed by the CPU including GPS coordinates, biometric equipment data, and control information.

The telephone interface and the stack interface 102 of the CPU are connected to the DSP 76 for also generating the IP signals as understood by those skilled in the art. The DSP 76 has a VoIP stack 104 for communicating voice over the Internet 36. The VoIP stack 104 may include echo cancellation 106, automatic gain control (AGC) 108, and packet encapsulation 110. In the preferred embodiment, the VoIP operates using voice codecs G.723 and G.729; however, other codecs may be used with the subject invention.

The microphone 80 and the speaker 78 interface with the VoIP stack 104 to record and transmit voice using VoIP across the Internet 36. The digital signal from the user device 32 includes packets of information, such as audio and data packets. Both types of packets are transmitted between the monitoring database 34 and the user device 32. Those skilled in the art recognize that in order to utilize internet protocols, the digital signal must travel in packets. In this manner, the user device 32 may be constantly monitoring the location of the user by way of GPS coordinates and transmitting this information as data packets to the monitoring database 34. Other data packets that may be transmitted from the monitoring database 34 include medication reminders to alert the user to take medication. Other data may include any information received by the user device 32 from biometric equipment 44. When the user activates the user device 32 and establishes bidirectional audio communication, the audio packets are transmitted using VoIP.

FIG. 4 is an exploded perspective view of one embodiment of the user device 32. The user device 32 includes a housing 112 surrounding the two circuit boards. The housing 112 is preferably formed of plastic, but may be formed of any other durable, lightweight material to be carried by the user. More preferably, the housing 112 is watertight to prevent water from entering the user device 32 and damaging the components within the housing 112. The housing 112 includes a top shell 114 and a bottom shell 116 and is generally oval shaped. The bottom shell 116 has an access 118 for accessing the power supply 96 and a serial interface module 120. This embodiment of the user device 32 includes three light emitting diodes (LED) 122 for alerting the user and three push buttons 124. The push buttons 124 may activate the device, cancel an emergency, or clear the device. Preferably, the GPS receiver 38, the RF module 42, and the cellular modem 40 are disposed within the housing 112 to prevent damage thereto. The power supply 96 is preferably a battery that snap-fits onto or into the housing 112 as understood by those skilled in the art.

FIG. 5 is a side view of another embodiment of the user device 32 being an elongated oval shaped and having a liquid crystal display (LCD) 126 to alert the user in place of the LEDs in FIG. 4. The user device 32 in this embodiment has one push button 124 that may be used to both activate and cancel notifications. An ear bud plug 128 is included for connecting an ear bud in place of the speaker 78. FIG. 6 is a side view of yet another embodiment of the user device 32 shown generally as triangular shaped. The user device 32 has two push buttons 124, one to activate and one to cancel notifications. The user device 32 includes an indicator 130 for alerting of messages on the user device 32 to be played.

Figure 7A:
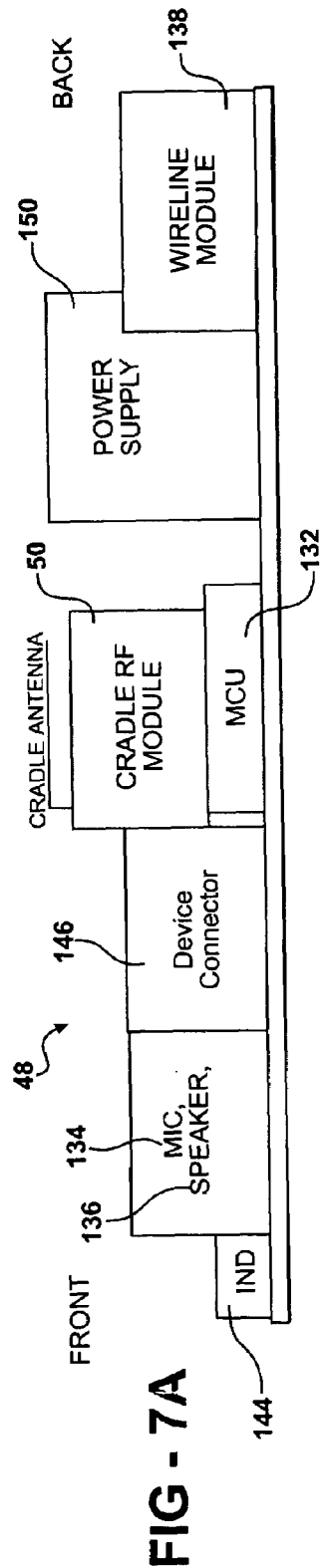
FIG. 7A is a side view of a cradle for communicating with the user device.
Figure 7B:
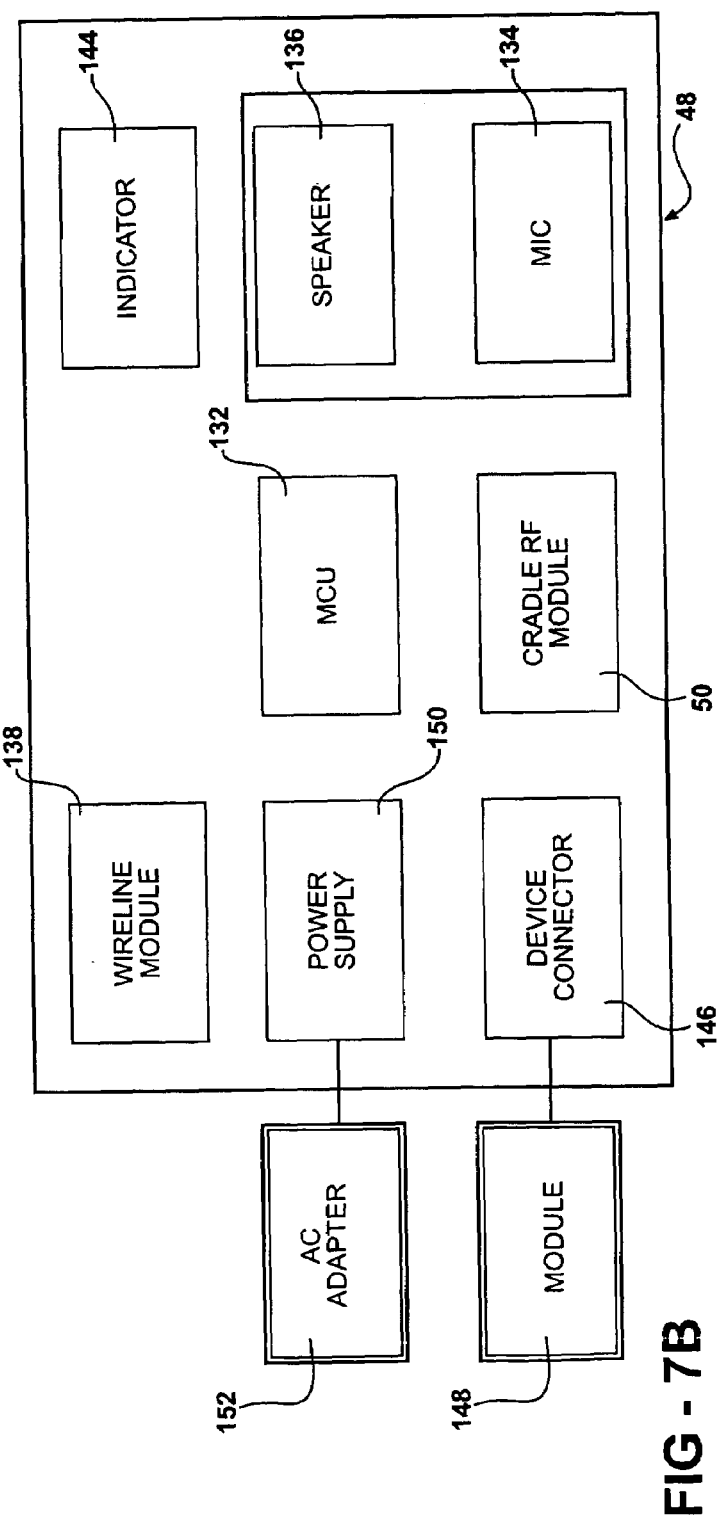
FIG. 7B is a top down view of the cradle.

Referring to FIGS. 7A and 7B, a schematic view of the cradle 48 is illustrated. The cradle 48 includes a main control unit (MCU) 132 communicating with a microphone 134 and speaker 136, the RF module 50, and a wireline module 138. The RF module 50 communicates with the user device 32 via radio frequency signals. The wireline module 138 is connected to the Internet 36 and may be either a modem 140 for connecting through the PSTN 56 or a network card 142 for connecting through an Ethernet connection (shown in FIG. 1). In the preferred embodiment, the cradle 48 includes both the modem 140 and the network card 142. When the modem 140 is used, the cradle 48 uses the PSTN 56 to access the Internet 36 through a service provider, whereas, when the network card 142 is used, the cradle 48 is directly connected to the Internet 36. These may be accomplished using cable modems or digital subscriber lines (DSL) or any other type of connection to the Internet 36.

The cradle 48 further includes an indicator 144 to alert the user of the status of the cradle 48 and/or the user device 32. The user device 32 is inserted into a device connector 146 for connecting to the cradle 48. When connected, the cradle 48 charges the user device 32 and may allow the user to communicate directly through the cradle 48. The cradle 48 may also include a secondary connector (not shown) for receiving and charging additional power supplies. This ensures that the user will always have a charged power supply 96 available when the user device 32 is not charging in the cradle 48. The device connector 146 may be connected to a module or base 148 for receiving the user device 32. FIG. 7B illustrates a top down view of the cradle 48. A power supply 150 connects to an AC adapter 152 for powering the cradle 48 and for charging the user device 32.

Figure 8:
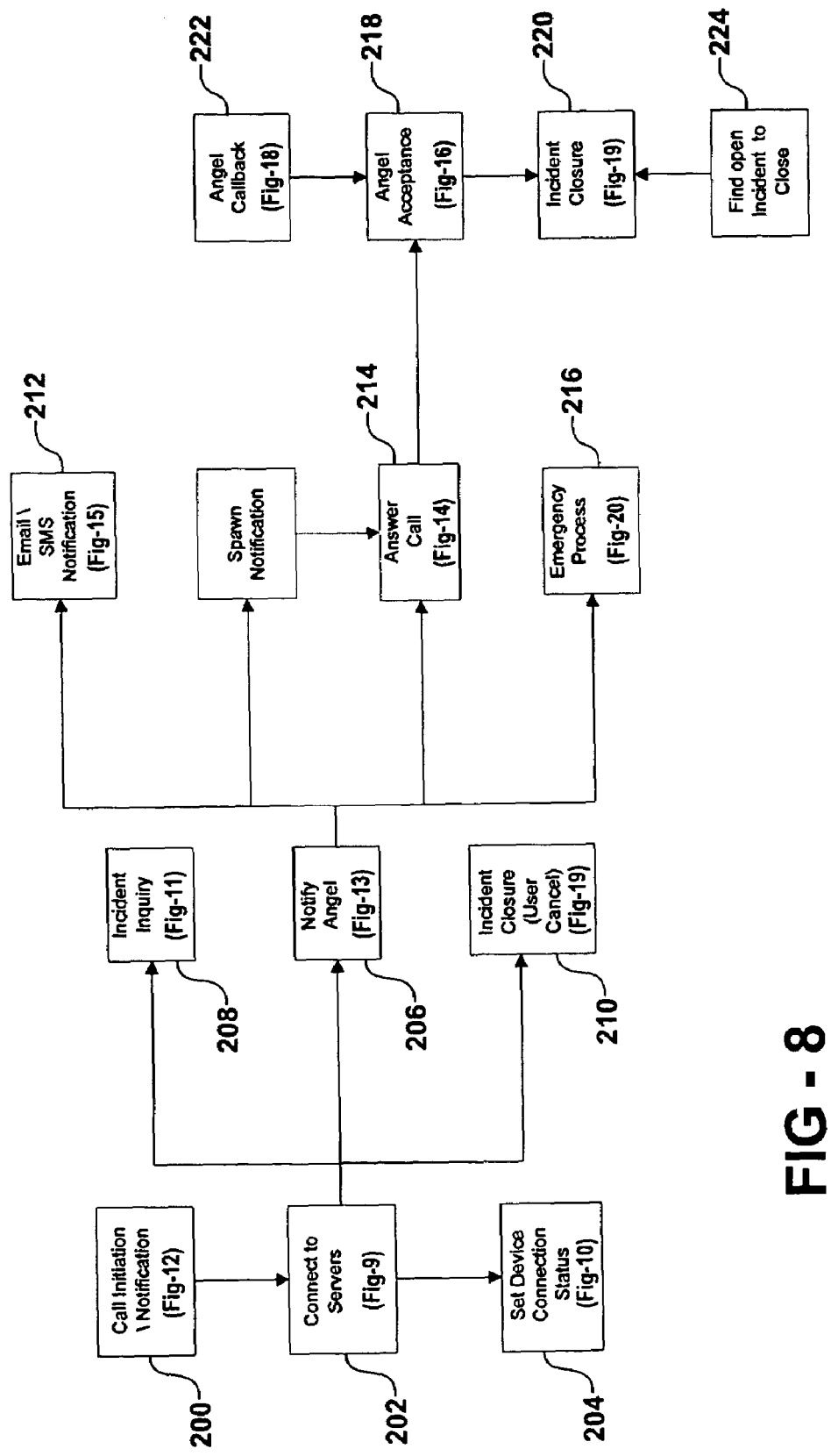
FIG. 8 is a flowchart illustrating a method of providing emergency response to the user carrying the user device.

The subject invention also affords a method of providing emergency response to the user carrying the user device 32 and the method is illustrated in a flowchart shown in FIG. 8. The steps in FIG. 8, if indicated, correspond to a more detailed flowchart in the succeeding Figures. The method includes the steps (not shown in FIG. 8) of establishing the monitoring database 34, establishing the internet protocol (IP) address for the monitoring database 34, and establishing the IP address for each user device 32. In step 200, a call is initiated from the user device 32 or the user device 32 is notified by the monitoring database 34. Then, the user device 32 and the monitoring database 34 are connected in step 202. A connection status is set for the user device 32 in step 204.

Once the connection is established between the monitoring database 34 and the user device 32, three different steps may occur. The monitoring database 34 may notify one of the contacts listed for the device (step 206), make an incident inquiry (step 208), or close the incident (step 210). The notifying of the contact may by broken down into at least four different steps to notify the contact. First, the contact may be notified through email or SMS notification in step 212. Alternatively, the contact may be telephoned and communicated with directly in step 214, or an emergency response may be initiated in step 216. When the contact is in direct communication, the contact may accept (step 218) and then the incident is closed (step 220). If the contact did not accept, then the contact may be notified a second time in step 222. The monitoring database 34 also monitors open incidents and closes any that may need to be closed (step 224)

Figure 9:
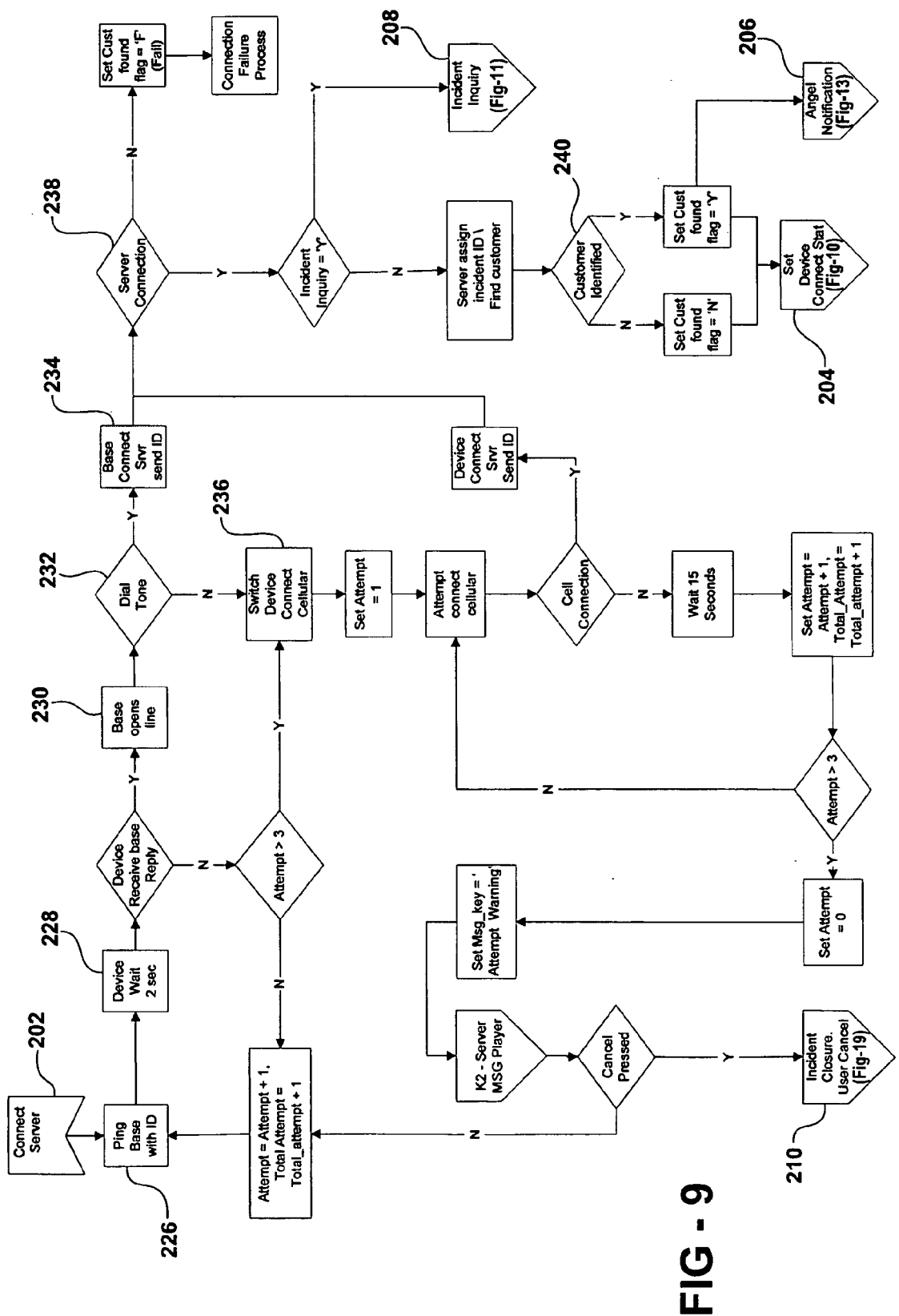
FIG. 9 is a flowchart illustrating the user device connecting with the monitoring database.

Referring to FIG. 9, a flowchart illustrates the user devices 32 connecting with the monitoring database 34 in step 202. The user device 32 transmits a signal having the device identification to the monitoring database 34 in step 226. The user device 32 waits in step 228 for a response and when the response is successful, the user device 32 opens a line for communication in step 230. The user device 32 then determines if a dial tone is present in step 232. When there is a dial tone, the user device 32 connects through the cradle 48 in step 234. If no dial tone is present, the user device 32 uses cellular connections to connect to the monitoring database 34 in step 236. In order to transmit the digital signal, the user device 32 may detect the presence of either one of the cellular network or the cradle 48. If the cradle 48 is detected, then the digital signal is transmitted via RF signals from the user device 32 to the cradle 48 and over the Internet 36. If the cradle 48 is not detected, then the user device 32 employs the cellular modem 40 to access the cellular network. The digital signal is then transmitted to the cellular network and over the Internet 36. It is to be appreciated that the subject invention may utilize only the cellular modem 40 without attempting to detect the cradle 48. However, the preferred method utilizes both the cellular modem 40 and the cradle 48 because the cellular modem 40 may have poor reception inside of structures or the cellular network coverage may be limited.

The user device 32 will attempt to connect to the monitoring database 34 in step 238 and if the connection is not possible, the user device 32 will alert the user. After connecting with the monitoring database 34, the device information is identified to verify the user in step 240. If the device is not authorized, then the connection is terminated. If it is recognized, then the monitoring database 34 notifies the contacts in step 206.

Either one or both of the selected user device 32 and the contact may be notified depending upon the emergency or incident. For example, if the user activates the user device 32, then the activated user device 32 is selected and the monitoring database 34 then notifies one of the contacts associated with the selected user device 32. Alternatively, if the user is required to take medication at a certain time, the monitoring database 34 selects the user device 32 and notifies the user device 32 which in turn alerts the user to take his medication. In this medication notification example, the monitoring database 34 may not notify any of the contacts associated with the selected user device 32. However, if the user does not take his medication, then the emergency may escalate and the monitoring database 34 may then notify the associated contacts. The medication notification will be described in more detail below.

Figure 10:
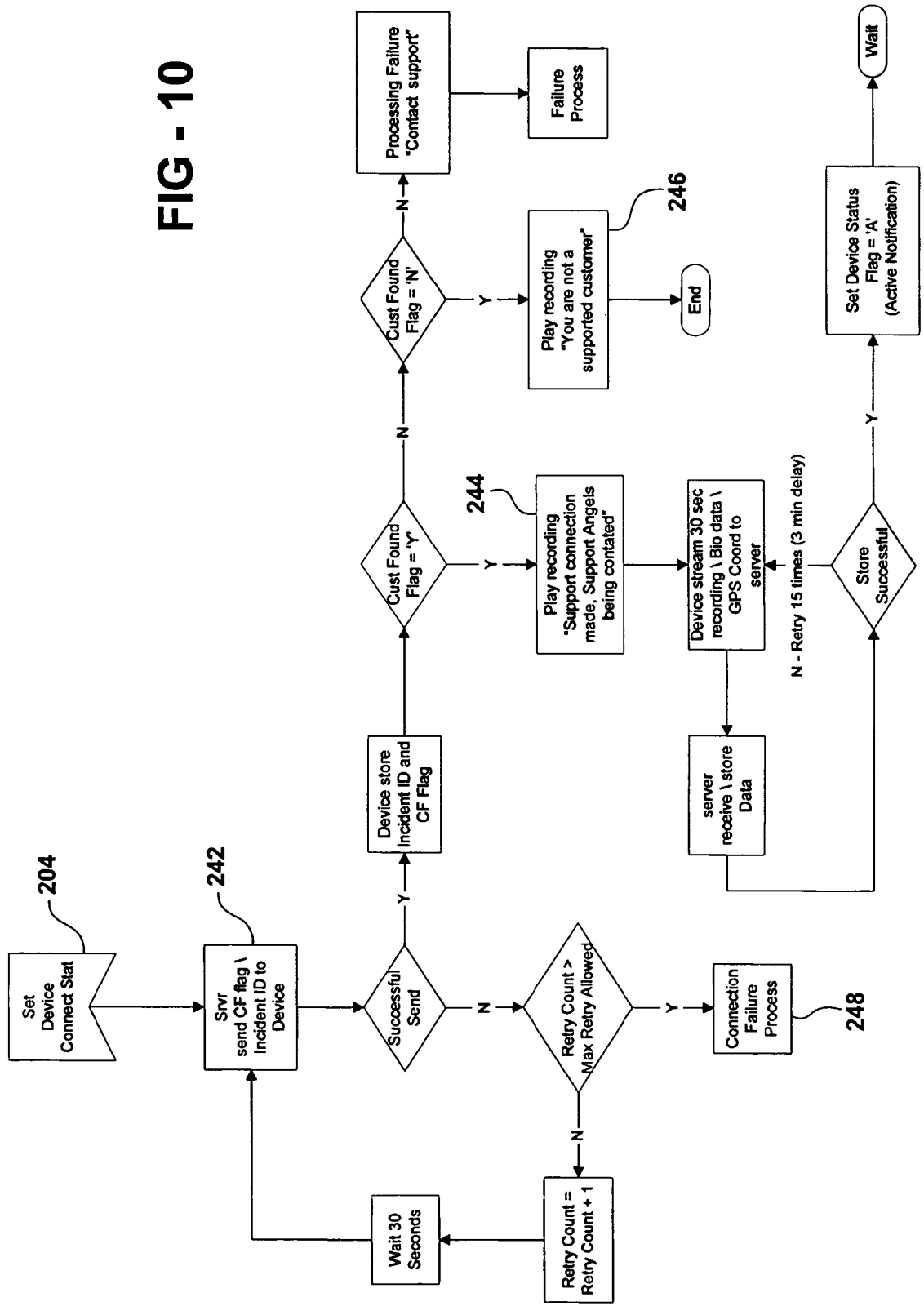
FIG. 10 is a flowchart illustrating the connection of the user device to the monitoring database and setting the connection status on the user device.

FIG. 10 is a flowchart illustrating the connection of the user device 32 to the monitoring database 34 and setting the connection status on the user device 32 (step 204). Independent of whether the user information is retrieved from the monitoring database 34, the monitoring database 34 transmits a flag to the user device 32 in step 242. If the transmission is successful, then the user device 32 stores the flag. If the flag is found in the monitoring database 34, then a recording is transmitted to the user device 32 stating that contacts are being notified in step 244. If the flag is not found, a message is transmitted to the user device 32 stating that the user device 32 is not supported in step 246. If the monitoring database 34 is unable to send the flag to the user device 32, the monitoring database 34 will retransmit the flag and then, if unsuccessful, terminate the connection in step 248.

One contemplated method of notifying the contact transmits a prerecorded message to the contact. The prerecorded message is stored in the monitoring database 34 and is transmitted to the contact associated with the selected user device 32. The prerecorded messaged may include the type of emergency or incident and the response to be taken by the contact. For example, the contact may be requested to notify the monitoring database 34 that they accept or decline to respond to the emergency. In this manner, the monitoring database 34 monitors the response of the contact and will continue notifying additional contacts until a response is confirmed by one of the contacts. After the contact has accepted and responded, the monitoring database 34 may transmit a response signal to the user device 32 to alert the user. The use of the Internet 36 to connect the user device 32 and the monitoring database 34 is of utmost importance. The use of the Internet 36 reduces the cost of operating and maintaining such a system 30 and allows for a wider variety of applications for the subject invention. Further, the Internet 36 reduces human intervention such that the monitoring database 34 fully automates the notification of contacts. Reducing human intervention further reduces the cost of operating and maintaining the system 30.

Another advantage of the subject invention is that bidirectional audio communication may be established between the user device 32 and the contact responding utilizing VoIP. Therefore, when the contact is notified, the contact will be in immediate communication with the user through the user device 32. This is an improvement over related art systems that are connected directly to the PSTN 56. These related art systems connected to the PSTN 56 act as a speakerphone such that if the user encounters an emergency or incident at a distance far from the speakerphone, the user is not be able to communicate the nature of the emergency to the human advisor. When the emergency is unknown, emergency personnel, such as police officers, may be called to respond, when such a response is not required. Therefore, the user will not activate their system for fear of being unable to communicate the nature of the emergency effectively and being embarrassed when emergency personnel arrive. The subject invention overcomes these problems by allowing the user to establish communication directly through the user device 32 with the contact. So long as the device is within arms reach, the user can be put into immediate contact through the monitoring database 34.

Figure 11:
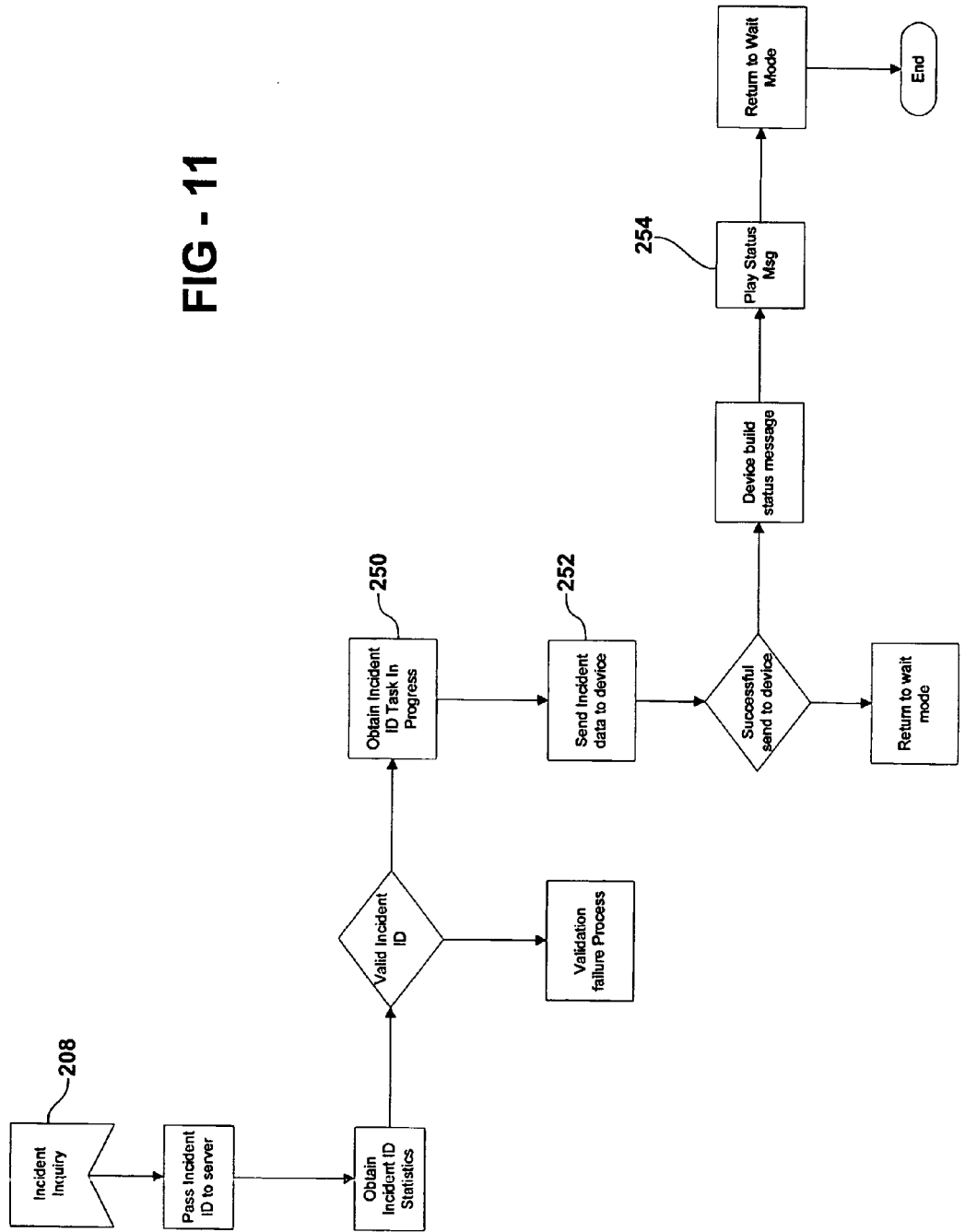
FIG. 11 is a flowchart illustrating an incident inquiry between the user device and the monitoring database in a given incident.

FIG. 11 is a flowchart illustrating an incident inquiry between the user device 32 with the monitoring database 34 in a given incident (step 208). The incident, such as low blood pressure or pulse rate, is raised in the monitoring database 34 and is validated against the user information. Alternatively, a timed alert, such as medication alert, may be present in the user information stored in the monitoring database 34. When the time arises for the timed alert, the monitoring database 34 would select the user device 32 and transmit the digital signal to alert the user. In another embodiment, one of the contacts may access the monitoring database 34 and request the user to notify the contact such that the monitoring database 34 would alert the user by way of the user device 32. If the incident is valid, an incident identification is obtained (step 250) and transmitted to the device in step 252. The user device 32 then plays a status message in response to receiving the incident identification in step 254.

Figure 12:
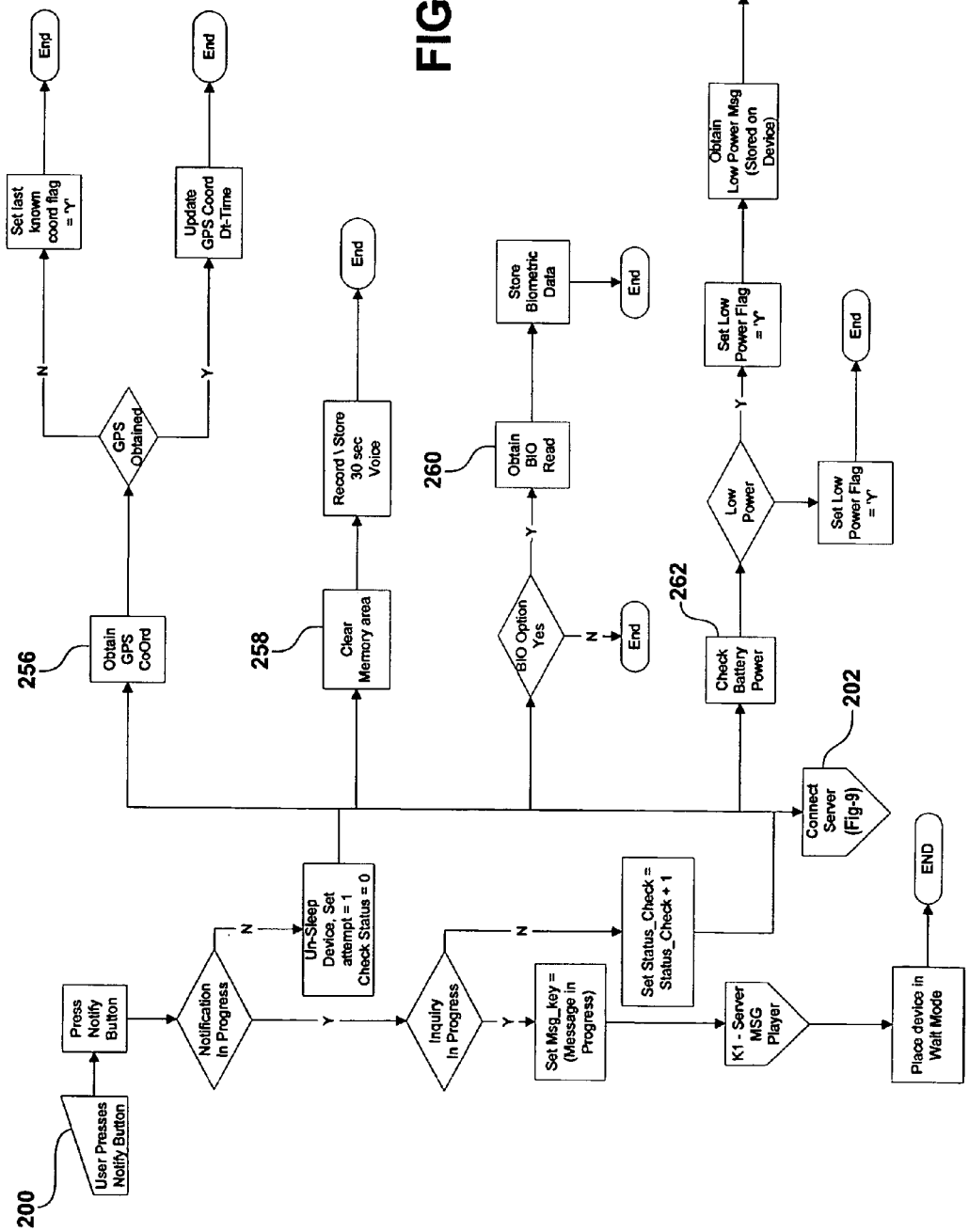
FIG. 12 is a flowchart illustrating the selection of the user device in response to the user activating the user device.

Referring to FIG. 12, another flowchart illustrates the selection of the user device 32 by the user activating the user device 32 in step 200. To activate the user device 32, the user presses the keypad thereby sending the signal to the monitoring database 34 which would then select the user device 32. While the user device 32 is notifying the monitoring database 34, the user device 32 may obtain GPS coordinates in step 256, clear memory status in step 258, receive biometric data in step 260, and check battery power in step 262. This information can then be transmitted to the monitoring database 34 as needed. Additionally, the user device 32 may indicate to the user that the notification is in progress and will notify the user once the connection to the monitoring database 34 is complete. Once the connection is established with the monitoring database 34 in step 202, the notifying of the contact begins.

Figure 13:
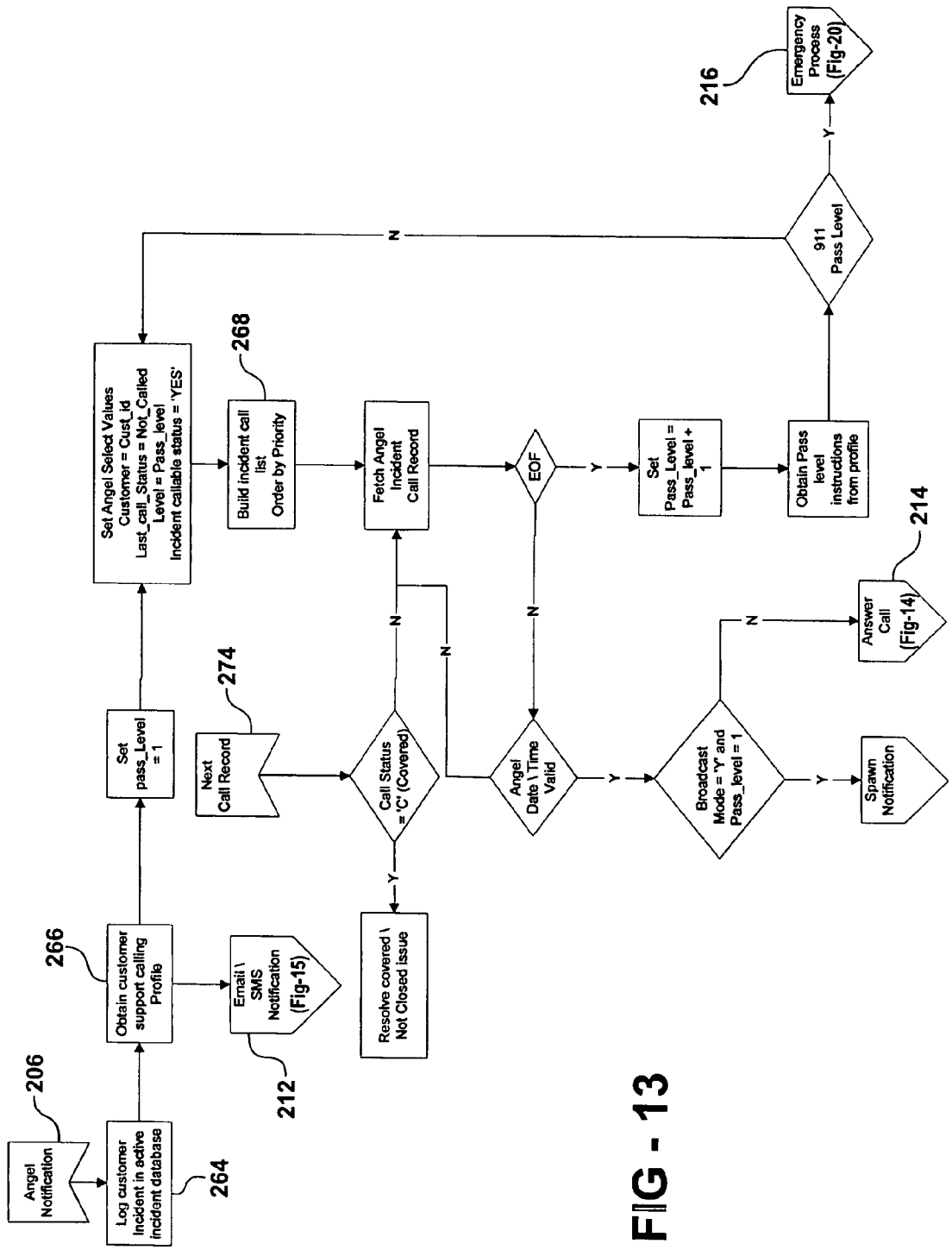
FIG. 13 is a flowchart illustrating the notification of the contacts by the monitoring database.

Once the monitoring database 34 receives the alert from the user device 32, the contacts are notified in step 206. FIG. 13 is a flowchart illustrating the notification of the contacts. The monitoring database 34 logs the incident in step 264 and obtains the user information and list of contacts in step 266. The monitoring database 34 may then transmit this information to the contacts via email or SMS notification in step 212. The monitoring database 34 builds a call list (step 268) ordering the contact by priority and by method of contacting each one. The contacts are then notified in the order of the call list and by the preferred method in step 214. The monitoring database 34 monitors the call status until it is accepted by the contact and then closes the incident. If the call is not accepted, then the monitoring database 34 selects the next contact in the call list. This continues until a preselected time by either the user or the monitoring database 34, when emergency personnel are contacted in step 216. The emergency personnel may include 911 or local police, fire, and medical personnel if 911 is not available.

Figure 14:
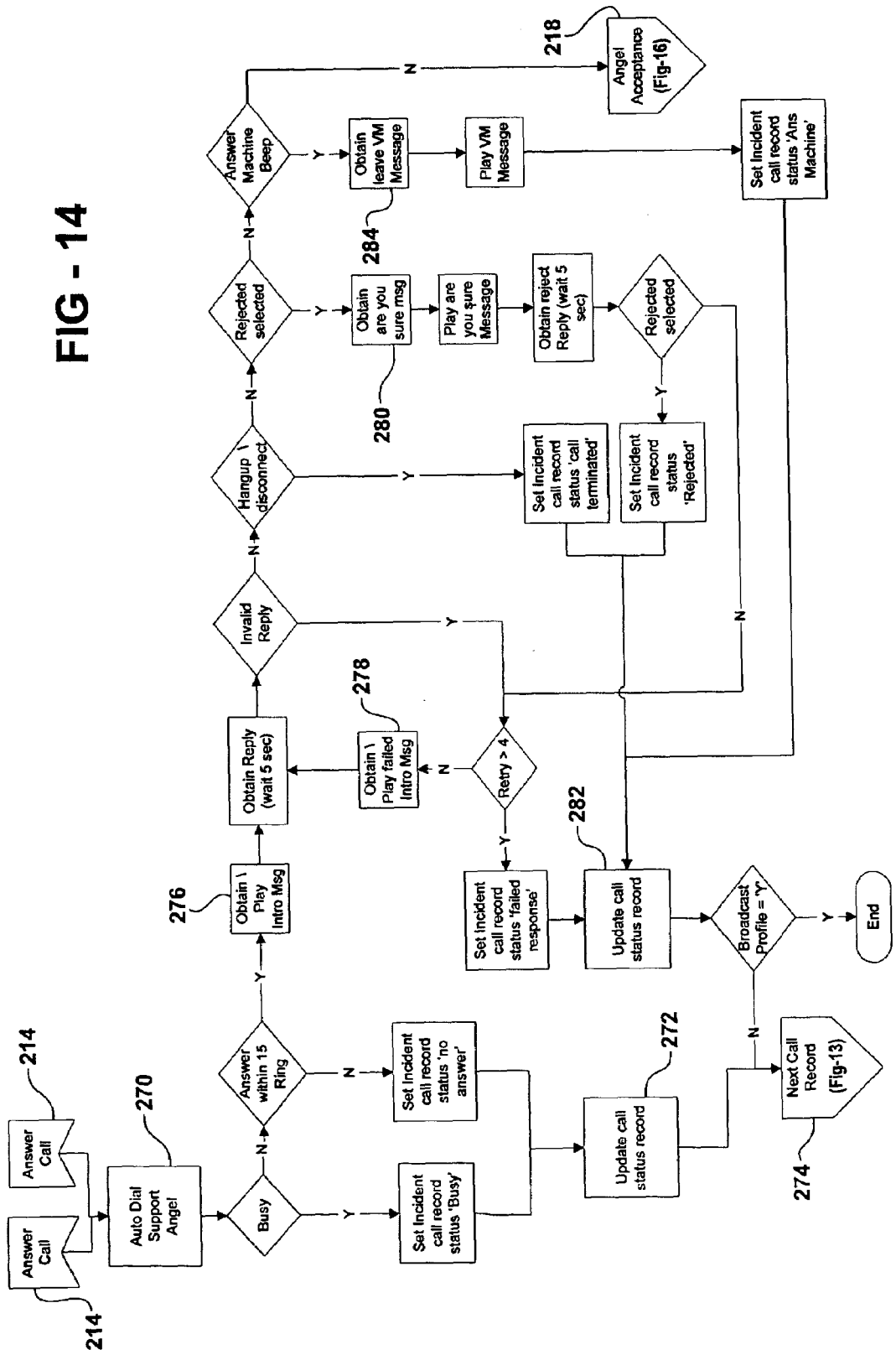
FIG. 14 is a flowchart illustrating the monitoring database notifying the contacts via a telephone.

FIG. 14 is a flowchart illustrating the monitoring database 34 notifying the contacts via telephone. The monitoring database 34 dials the telephone number associated with the contact in step 220. If the telephone number is busy, the monitoring database 34 automatically redials. If still no answer, then the call status for the contact is updated (step 272) and the monitoring database 34 continues to the next contact in step 274. If the contact answers, then the monitoring database 34 obtains a message and plays it for the contact in step 276. If the contact accepts, the monitoring database 34 disconnects and notifies the user through the user device 32 of the acceptance in step 218. The contact may accept by various methods, such as press a certain key or verbally responding to a prompt. The monitoring database 34 will replay the message if the reply from the contact is invalid in step 278. If the contact does not accept, then the monitoring database 34 confirms the rejection (step 280), updates the call status (step 282), and notifies the next listed contact (step 274). Likewise, if the monitoring database 34 encounters an answering machine, the monitoring database 34 will leave a voice message in step 284, update the call status in step 282, and notify the next contact in step 274.

Figure 15:
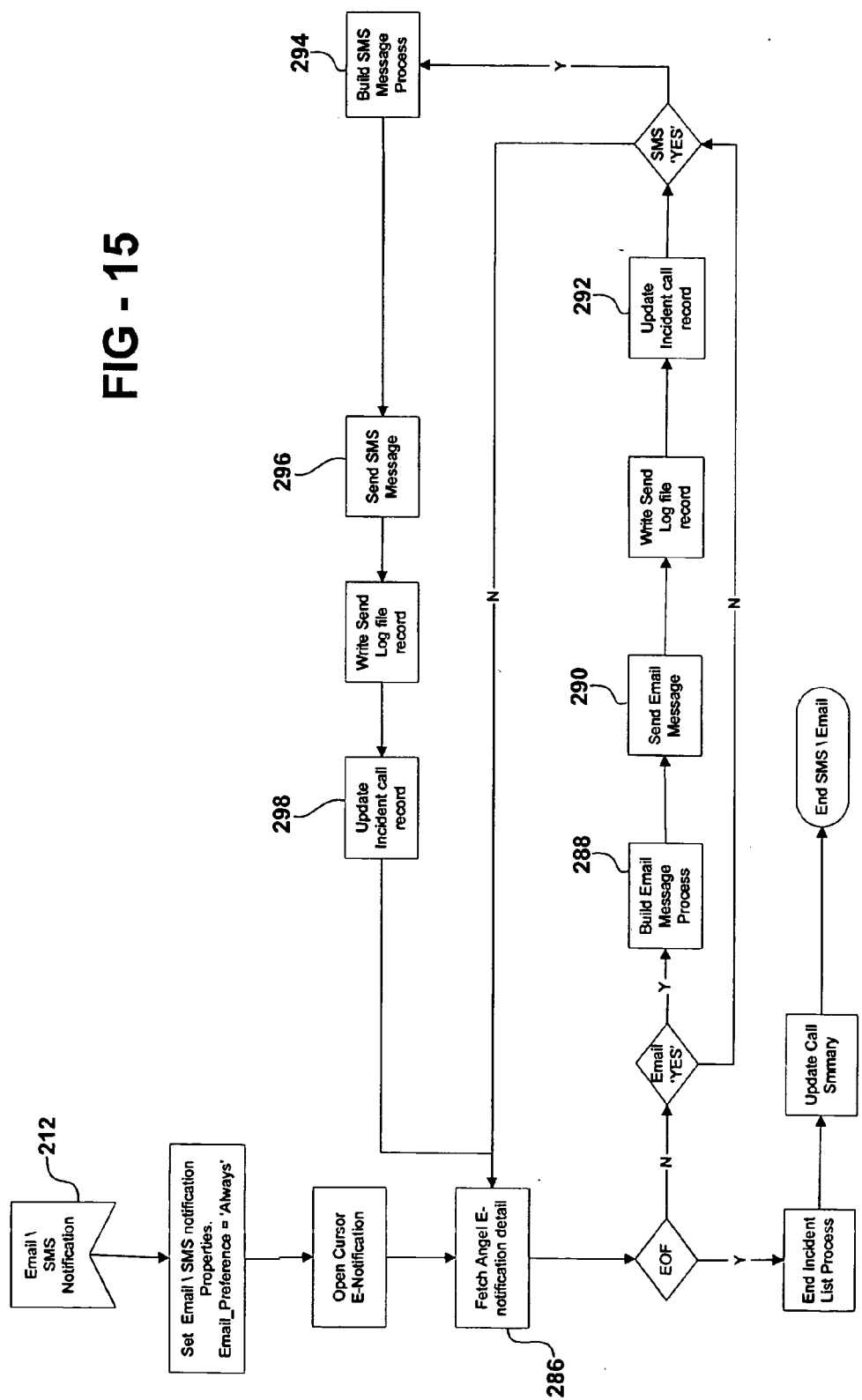
FIG. 15 is a flowchart illustrating the monitoring database notifying the contacts via email or SMS messaging.

An alternative method of notifying the contacts via email or SMS messaging (Step 212) is illustrated in a flowchart shown in FIG. 15. The monitoring database 34 retrieves the contact information in step 286. If email is selected, the monitoring database 34 builds an email message (step 288), transmits it to the contact (step 290), and updates the call record (step 292). If SMS is selected, the monitoring database 34 builds a SMS message (step 294), transmits it to the contact (step 296), and updates the call record (step 298).

Figure 16:
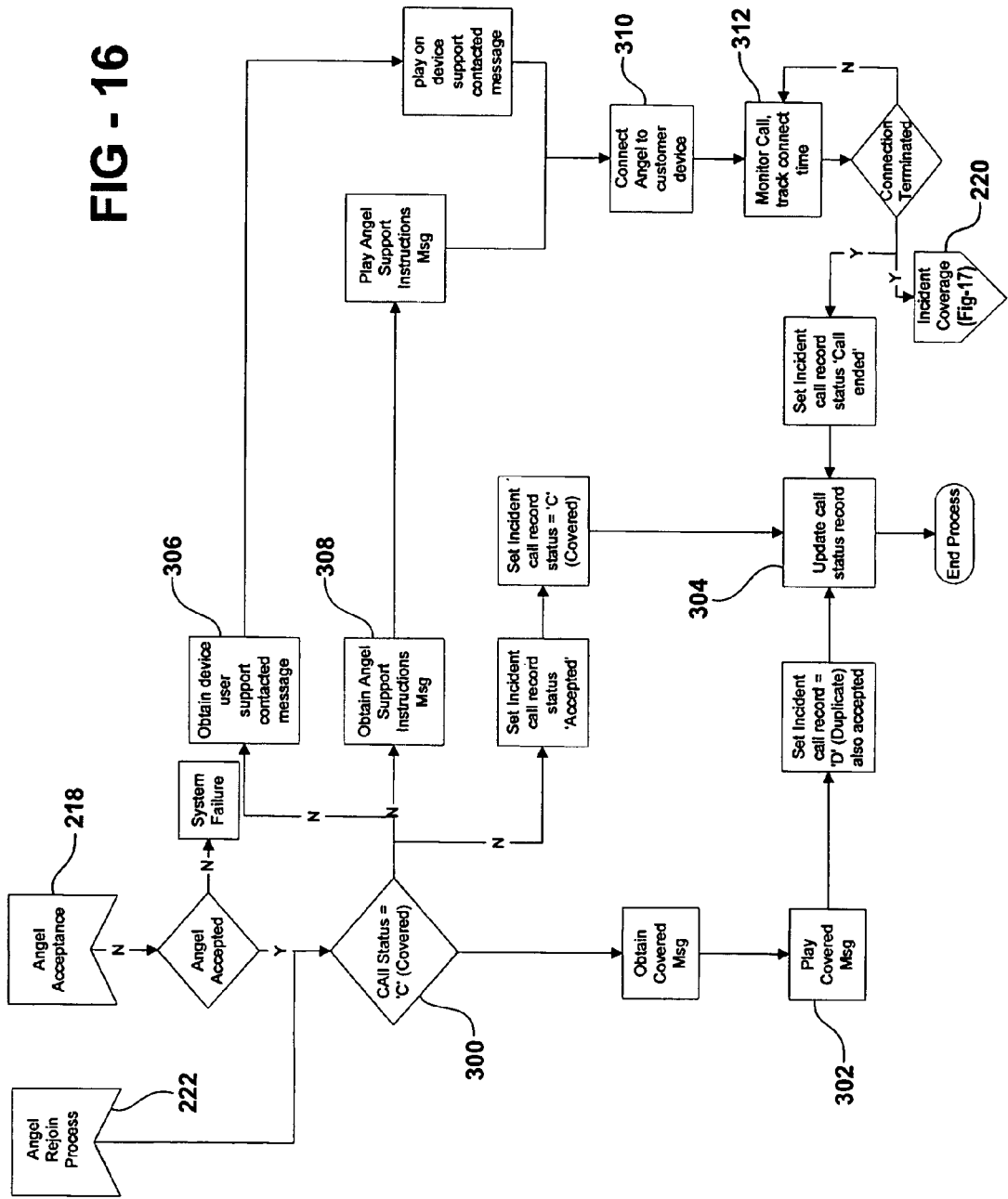
FIG. 16 is a flowchart illustrating the acceptance of the contacts after being notified.

FIG. 16 is a flowchart illustrating the acceptance of the contacts to handle the incident or emergency. If none of the contacts accepts, emergency personnel may be contact immediately. Once the contacts accept, the call is marked as covered in step 300 and the monitoring database 34 transmits the covered message to the user device 32 in step 302, and the status of the call is the updated in step 304. If the call is not covered, the monitoring database 34 transmits one of a support contacted message to the user device 32 (step 306) or a contact instruction message to the user device 32 (step 308). The contact is then directly connected to the user device 32 in step 310. In order to establish the bidirectional communication, the audio from the user is instantaneously recorded, the audio packets are created from the audio, and the audio packets are transmitted to or exchanged with the monitoring database 34. A similar process converts the contact audio for transmission over the Internet 36 as understood by those skilled in the art. The call is monitored (step 312) and when it is terminated, the incident is covered (step 220) and the call status is updated (step 304).

Figure 17:
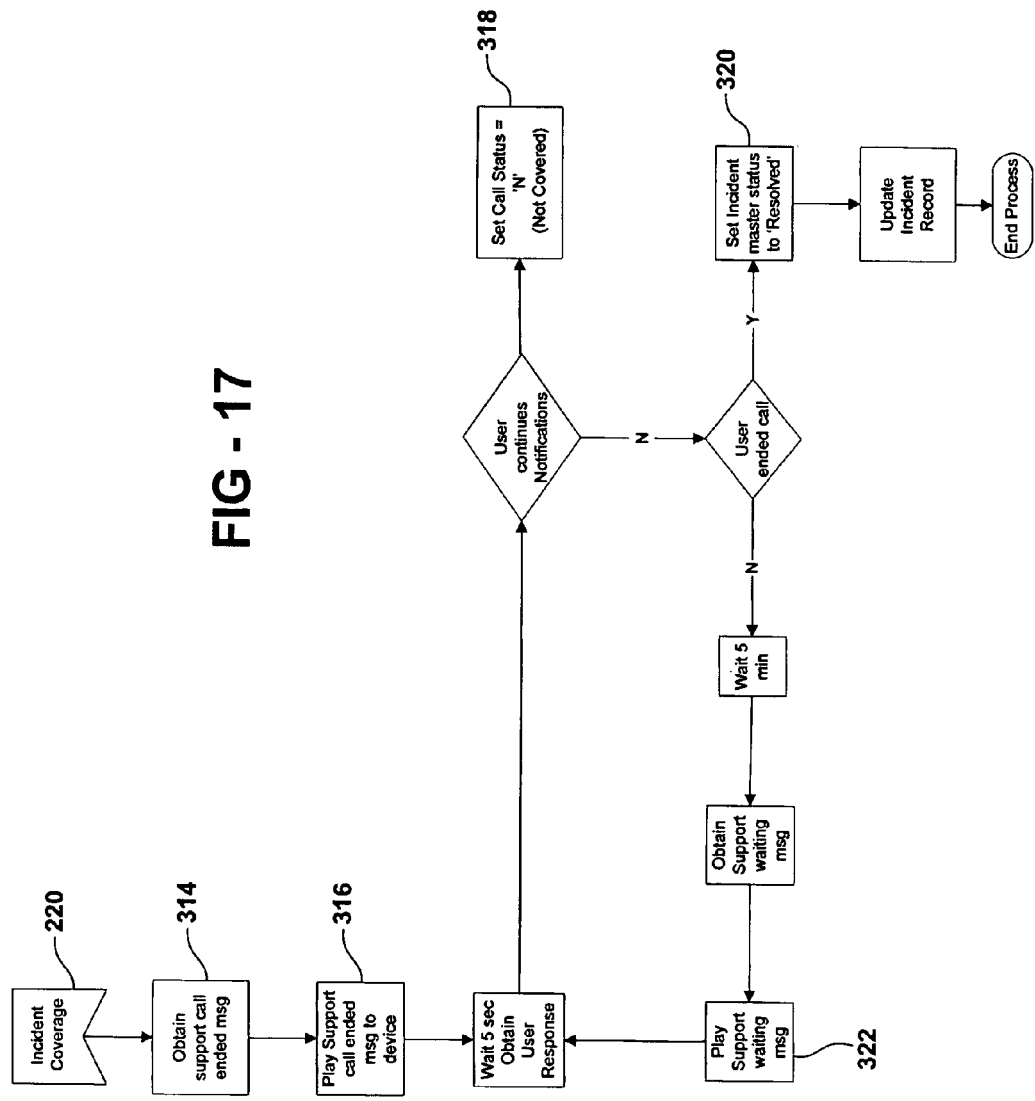
FIG. 17 is a flowchart illustrating the notification of the user of the incident being covered by one of the contacts.

With reference to FIG. 17, a flowchart illustrates the notification of the user of the incident being covered in step 220. The monitoring database 34 obtains a support call ended message (step 314) and transmits the message to the user device 32 (step 316). If the user activates the user device 32 in response the message, the call status remains not covered (318). However, if the user does not continue to activate the user device 32 and ends the call, then the call is ended and the monitoring database 34 updates the status to resolved in step 320. If the user does not end the call, the monitoring database 34 waits and transmits a support waiting messages (step 322) and waits for the user to respond.

Figure 18:
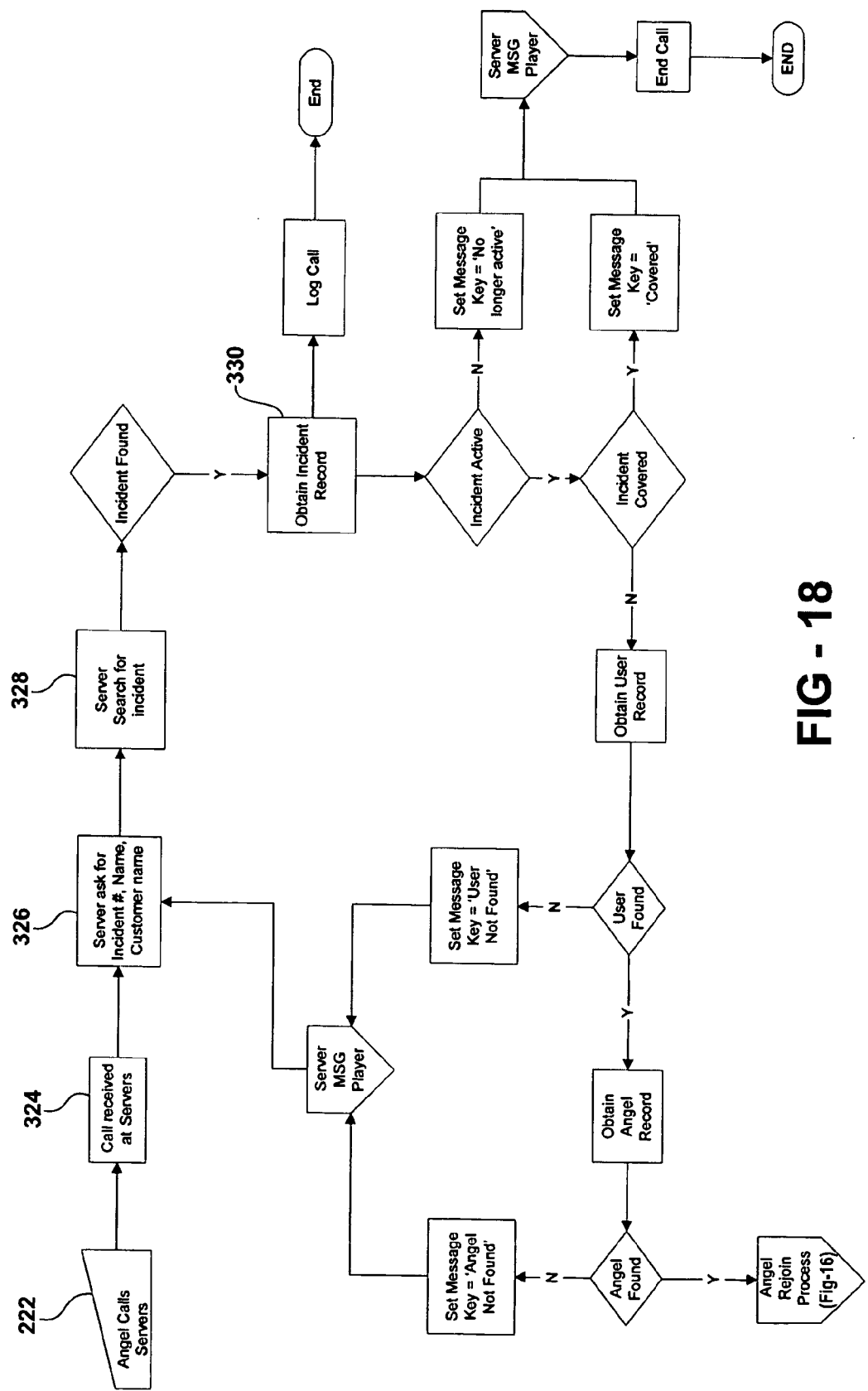
FIG. 18 is a flowchart illustrating the contact directly contacting the monitoring database to inquire about an incident.

The contact may directly contact the monitoring database 34 (step 222), as illustrated in the flowchart of in FIG. 18. The contact calls into the monitoring database 34 (step 324) and inputs information (step 326), such as the incident number, name, user name, etc. to identify the contact. The monitoring database 34 searches for the incident (step 328) and obtains the incident record (step 330). The call is then logged and if the incident is no longer active, the contact is advised of the closed status. If the incident is active and covered, the monitoring database 34 informs the contact accordingly. If the incident is active and uncovered, the user information is obtained, and the contact rejoins the method as illustrated in FIG. 16.

Figure 19:
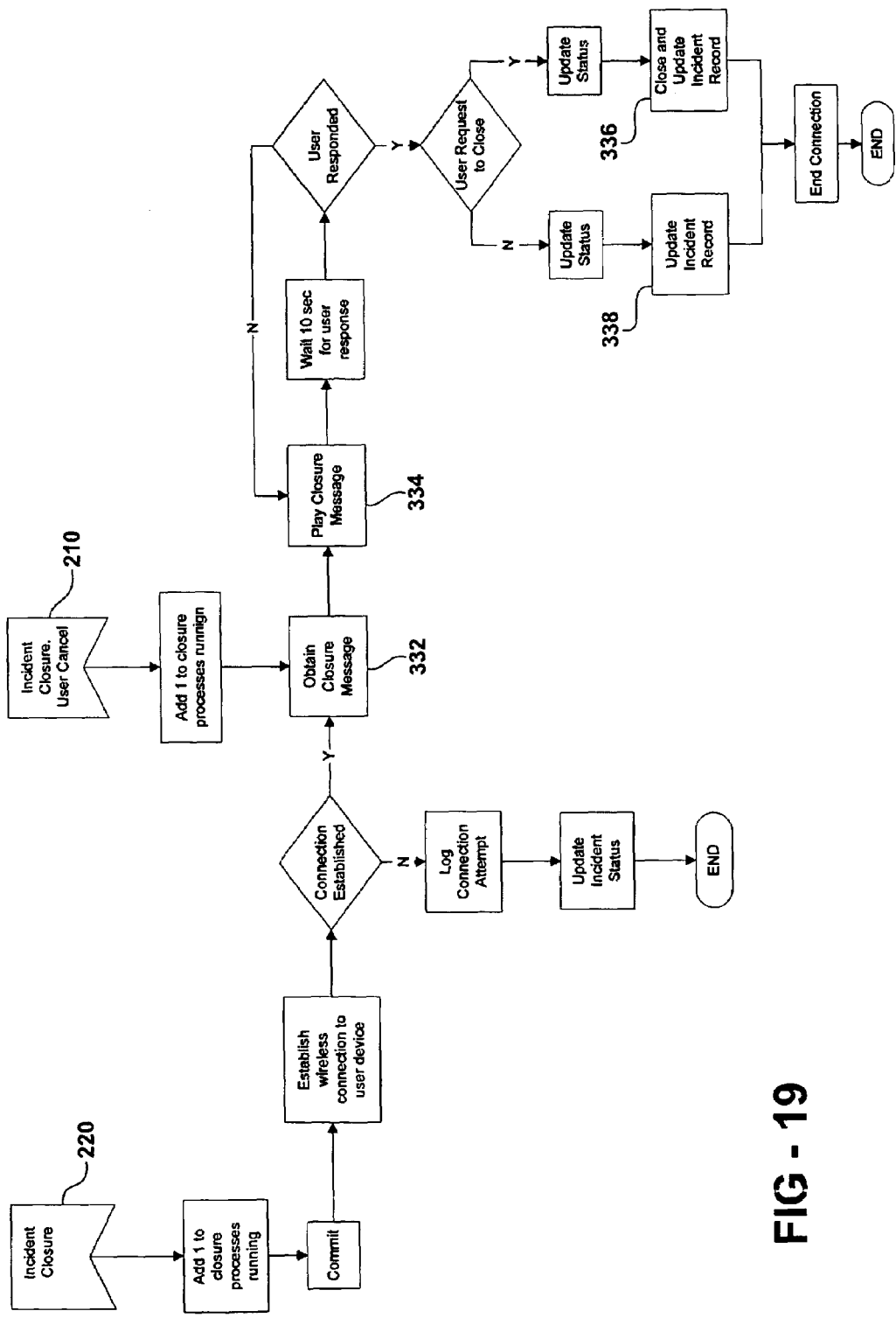
FIG. 19 is a flowchart illustrating the closure of an incident by the monitoring database.

The incident is closed as illustrated in the flowchart shown in FIG. 19. The monitoring database 34 contacts the user device 32, obtains a closure message (step 332), transmits the message to the user device 32 (step 334), and waits for the user. If the user requests the incident to be closed, the incident is closed in the monitoring database 34 and the status is updated (step 336). If the user does not request the incident to close, it remains active in the monitoring database 34 (step 338). If the user does not respond to the closure message, the monitoring database 34 continues to transmit the message.

Figure 20:
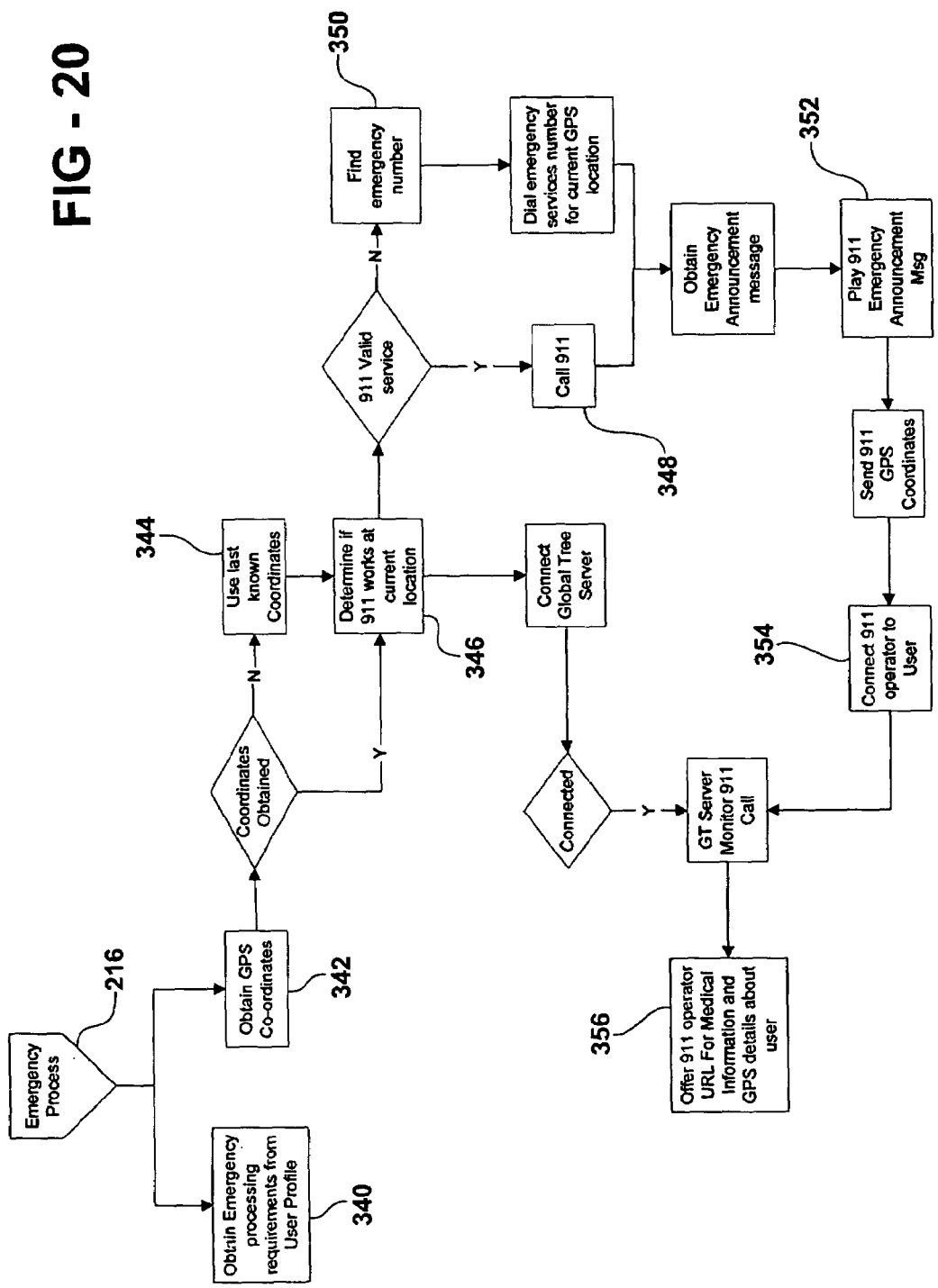
FIG. 20 is a flowchart illustrating an emergency process which occurs in predetermined incidents.

When the user does not respond or when the contacts do not respond, an emergency process may be instituted in step 216. FIG. 20 is a flowchart illustrating the emergency process. The monitoring database 34 retrieves the user information in step 340 and any associated emergency response information. The monitoring database 34 also retrieves GPS coordinates from the user device 32 in step 342. If the monitoring database 34 is unsuccessful in obtaining the coordinates, the previous coordinates may be used in step 344. The monitoring database 34 determines if 911 works (step 346) at the current location and if so, 911 is contacted (step 348). If 911 does not work, the monitoring database 34 retrieves emergency service numbers for the coordinates in step 350. The monitoring database 34 transmits the emergency announcement along with the GPS coordinates in step 352. The 911 operator or emergency personnel are then connected directly to the user device 32 in step 354. The monitoring database 34 continues to monitor the call until completed. The monitoring database 34 may also offer user information to the 911 operator or the emergency personnel in step 356.

The user device 32 may also be used as a geofence, as the flowchart in FIG. 21 illustrates. The user may activate the user device 32 to train the user device 32 of the current coordinates in step 358. Alternatively, the user device 32 may retrieve the coordinates automatically or in response to a request from the monitoring database 34 in step 360. The GPS receiver 38 would be receiving the global positioning coordinates and the global positioning coordinates would be compared to a pre-defined boundary for the user device 32. When the user device 32 exceeds the boundary, the user device 32 would transmit the digital signal to the monitoring database 34 which would then either notify the user device 32 or the contacts associated with the selected user device 32. The global positioning coordinates may either be compared by the processor 74 in the user device 32 or transmitted back to the monitoring database 34 for comparison. If the comparison occurs at the monitoring database 34, then the contacts may be immediately contact when the geofence has been breached.

The monitoring database 34 may also determine a status of the user based upon the digital signal received from the user device 32 at the monitoring database 34. For example, the user device 32 may be in communication with biometric equipment 44, such that when the blood pressure of the user exceeds a threshold, the user device 32 transmits the digital signal to the monitoring database 34. The monitoring database 34 may then either notify the contacts or the monitoring database 34 may bypass the list of contacts and contact emergency personnel immediately. The bypassing of the contacts would only likely occur in a predetermined condition, such as, but not limited to, the user losing consciousness or having no heartbeat. These conditions are of a serious nature that medical or trained emergency personnel would be the first to be notified. The subject invention overcomes the inadequacies of the related art since the emergency personnel would not be notified unless the emergency was warranted.

The user device 32 may also record and store a message from the user. The recorded message may be transmitted for storage on the monitoring database 34 or it may remain on the user device 32. The user device 32 includes a display to alert emergency personnel or contacts of the recorded message. Such a display may include an LED that blinks when a message has been recorded. If the audio is to be played back at the user device 32, the audio from the user is recorded, audio packets are created from the audio, and then the audio packets are stored on the user device 32 for playback at the user device 32. This is particularly useful if the user loses consciousness before emergency personnel or the contact arrives.

The system 30 and the user device 32 are useful for medication notification to manage medications by indicating what to take and when and storing this information in the monitoring database 34. The monitoring database 34 also keeps track of changing medication requirements and different medications at varying levels and time frames. The user or an authorized contact establishes a list of medications that are associated with the user through a web based application. The user or authorized contact may adjust or modify prescriptions, such as if some medication is spilled. Medication information may include details about the medication, dosages and timing such as, but not limited to: identification of the medication and date filled; units of prescription (pills, tsp, patches, etc.); dosage size; dosage timing; pre-dosage comments and warnings; post-dosage comments and warnings; number of refills; number of dosages in prescription or in a refill; prescribing doctor; storage requirements such as refrigerate; expiration date; pharmacy filled by; when first dosage was taken (date, time); remaining dosages; or remaining dosage refill notification.

The monitoring database 34 will generate reports that are viewable over the Internet 36. The reports may include medication reports listing all medications that the user is currently taking, prescribing doctors and issuing pharmacies and virtual pillbox reports listing weekly schedules of when to take what medications. The monitoring database 34 may also generate confirmation reports that list medications and times they should have been taken. The confirmation report will show times that the user confirmed that they actually took the medications as well as highlight any issues that may have occurred at that time. Issues may be items such as delay in confirmation, inability to contact or follow up or contact the user and alerts raised by the monitoring database 34. The monitoring database 34 also generates alert reports identifying issues to be addressed such as prescriptions running low, refills to be obtained, or compliancy issues from the patient. The biometric data gathered from the biometric equipment 44 may also be used in conjunction with the medication notification.

If the user is not responsive or is not able to confirm that they have taken their medications in a reasonable amount of time, an alert will be routed directly to the contacts. When the monitoring database 34 notifies the contact, the contact will be directly connected to the user so they may speak directly with them and resolve the issue. All information gathered and communicated to and from the monitoring database 34 is accessed over a secured Internet 36 connection.

To notify and remind the user to take the medication, the monitoring database 34 transmits the reminder the user device 32. The notification may represent one or more medications that are to be taken and will be in the form of a recorded voice message. The user has the ability to replay this message, obtain details about the medications to be taken at this time, raise an alert, or to confirm they understand and will take the medications. If the user wants to know the details of what should be taken at this time and any information, the user will activate the user device 32 to play the medication instructions. The instructions are sent from the monitoring database 34 to the user device 32. After the information is presented, the user will have the option to replay the information, confirm and close the notification, or raise an alert.

After taking the medication, the user selects the confirmation option by activating the user device 32. The activation cancels the reminder and a notice is sent to the monitoring database 34 that the medication was taken. If no action is taken by the user, an alert is automatically raised. Alternatively, the user may raise the alert and be placed in direct voice communications with one of the contacts. The medication notification can also be used to notify the user to refill the medication and also for monitoring by the prescribing doctor.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, the reference numerals in the claims are merely for convenience and are not to be read in any way as limiting.

What is claimed is:

1. A method of providing emergency response to a user carrying a user device (32), said method comprising the steps of:

establishing a monitoring database (34) including identifications for a plurality of user devices (32) and user information associated with each of the user devices (32) including a list of contacts to be contacted in an emergency and methods of notifying the contacts for each user of each user device (32);

establishing an internet protocol (IP) address for the monitoring database (34);

establishing an IP address for each user device (32);

selecting one of the user devices (32) in the database;

detecting the presence of either one of a cellular network and a cradle (48) connected to the Internet (36) by the user device (32);

establishing communication over the Internet (36) between the monitoring database (34) and the selected user device (32);

receiving an incident inquiry with the monitoring database (34) from the selected user device (32);

automatically notifying a contact of the incident via a first notification method through the monitoring database (34) in response to receiving the incident inquiry:

receiving a response electronically with the monitoring database (34) from the contact as one of accepted, not accepted, or unresponsive; and automatically notifying the contact via a second notification method different than the first notification method through the monitoring database (34) as a result of the response by the first notification method being one of not accepted or unresponsive.

2. A method as set forth in claim 1 wherein the step of automatically notifying the contact is further defined as utilizing at least one of an internet protocol or a public switched telephone network to notify the contact.

3. A method as set forth in claim 1 wherein the step of automatically notifying the contact is further defined as transmitting a prerecorded message stored in the monitoring database (34) to the contact associated with the selected user device (32).

4. A method as set forth in claim 1 further comprising the step of transmitting a response signal from the monitoring database (34) to the user device (32) as a result of one of the contacts responding.

5. A method as set forth in claim 4 wherein the step of transmitting the response is further defined as establishing bidirectional audio communication between the user device (32) and the contact responding through the monitoring database (34) utilizing voice-over internet protocol.

6. A method of providing emergency response to a user carrying a user device (32), said method comprising the steps of:
   establishing a monitoring database (34) including identifications for a plurality of user devices (32) and user information associated with each of the user devices (32) including a list of contacts to be contacted in an emergency for each user of each user device (32);
   building a call list within the monitoring database (34) based upon the user information prioritizing the contacts and methods of notifying the contacts;
   establishing an internet protocol (IP) address for the monitoring database (34);
   establishing an IP address for each user device (32);
   selecting one of the user devices (32) in the database;
   establishing communication over the Internet (36) between the monitoring database (34) and the selected user device (32);
   retrieving the call list associated with the selected user device (32);
   automatically notifying a contact from the call list of the emergency through the monitoring database (34) using either internet protocols or public-switched telephone networks in response to establishing communication between the monitoring database (34) and the selected user device (32);
   receiving a response electronically to the monitoring database (34) from the contact;
   identifying the response from the contact as one of accepted, not accepted, or unresponsive with the monitoring database (34); and
   automatically continuing to notify additional contacts through the monitoring database (34) until the response is identified as accepted by one of the contacts.

7. A method as set forth in claim 6 wherein the step of notifying at least one of the selected user device (32) further comprises the step of transmitting a digital signal over a cellular network and over the Internet (36) using internet protocols to one of the IP addresses associated with the monitoring database (34) and the selected user device (32).

8. A method as set forth in claim 7 wherein the step of selecting one of the user devices (32) further comprises the step of activating the user device (32) and transmitting the digital signal from the user device (32) to the monitoring database (34).

9. A method as set forth in claim 8 further comprising the step of establishing an audio connection utilizing voice-over internet protocol between the user device (32) and the accepted contact through the monitoring database (34).

10. A method as set forth in claim 7 further comprising the step of determining a status of the user based upon the digital signal received from the user device (32) at the monitoring database (34).

11. A method as set forth in claim 10 further comprising the step of bypassing the list of contacts and contacting emergency personnel in response to the status of the user being a predetermined condition.

12. A method as set forth in claim 7 wherein the step of transmitting the digital signal is further defined as transmitting the digital signal from the monitoring database (34) to the user device (32).

13. A method as set forth in claim 12 wherein the step of transmitting the digital signal further includes the step of packaging audio and data packets for receipt by the user device (32).

14. A method as set forth in claim 13 wherein the step of packaging the data packets is further defined as packaging medication reminders in the data packets to alert the user to take medication.

15. A method as set forth in claim 7 further comprising the step of detecting the presence of biometric equipment (44) having a radio frequency module communicating via radio frequency signals with the user device (32).

16. A method as set forth in claim 15 further comprising the step of transmitting biometric data about the user from the biometric equipment (44) to the user device (32).

17. A method as set forth in claim 16 further comprising the step of packaging the biometric data with the digital signal and transmitting the digital signal from the user device (32) to the monitoring database (34).

18. A method as set forth in claim 17 further comprising the step of storing the biometric data in the monitoring database (34) for compiling medical reports about the user.

19. A method as set forth in claim 7 further comprising the step of alerting the user of communication between the user device (32) from the monitoring database (34).

20. A method as set forth in claim 19 further comprising the step of initiating playback of the digital signal from the monitoring database (34) by the user.

21. A method as set forth in claim 6 further comprising the step of establishing bidirectional audio communication through the monitoring database (34) between the user device (32) and the contact that accepted the notification utilizing voice-over internet protocol.

22. A method as set forth in claim 6 wherein the step of automatically notifying the contact further comprises:
   automatically notifying the contact via a first notification method;
   receiving a response electronically with the monitoring database (34) from the contact as one of accepted, not accepted, or unresponsive; and
   automatically notifying the contact via a second notification method different than the first notification method through the monitoring database (34) as a result of the response by the first notification method being one of not accepted or unresponsive.

23. A method as set forth in claim 6 further comprising the step of closing the incident in response to the contact accepting the notification.

24. An emergency alert system (30) comprising:
   a user device (32) carried by a user having a housing (112), a processor (74) communicating via internet protocols (IP), a memory source (82) storing an IP address for said user device (32) and an IP address for a monitoring database (34), a global positioning system (GPS) receiver (38) in communication with said processor (74), a radio frequency (RF) module (42) in communication with said processor (74) for transmitting and receiving RF signals, a cellular modem (40) in communication with said processor (74) for establishing a cellular connection, a speaker (78), and a microphone (80);

wherein said user device (32) transmits an incident inquiry via either the RF module (42) or the cellular modem (40) via the internet protocols;

a cradle (48) having a RF module (50) for communicating with said user device (32) via radio frequencies and a wireline module (138) being connected to the Internet (36); and a monitoring database (34) having an internet protocol address and including identifications for a plurality of user devices (32) and user information associated with each of said user devices (32) including a list of contacts to be contacted in an emergency for each user of each user device (32);

wherein said monitoring database (34) automatically notifies a contact of the emergency utilizing internet protocols and receives a response electronically from the contact as one of accepted, not accepted, or unresponsive and automatically continues to notify additional contacts until the response is accepted by one of the contacts.

25. A system as set forth in claim 24 wherein said list of contacts includes a preferred method of contacting each of the contacts.

* * * * *